US012651338B2

(12) United States Patent
Sasaki et al.

(10) Patent No.: US 12,651,338 B2
(45) Date of Patent: Jun. 9, 2026

(54) IMAGE DIAGNOSSIS ASSISTANCE DEVICE, IMAGE DIAGNOSSIS ASSISTANCE METHOD, AND IMAGE DIAGNOSSIS ASSISTANCE PROGRAM

(71) Applicant: KEIO UNIVERSITY, Tokyo (JP)

(72) Inventors: Hikaru Sasaki, Tokyo (JP); Tokunori Kanazawa, Tokyo (JP); Masato Nakaya, Tokyo (JP); Hirokazu Fujiwara, Tokyo (JP); Masahiro Hashimoto, Tokyo (JP); Tatsuaki Kobayashi, Tokyo (JP)

(73) Assignee: KEIO UNIVERSITY, Tokyo (JP)

( * ) Notice: Subject to any disclaimer, the term of this patent is extended or adjusted under 35 U.S.C. 154(b) by 280 days.

(21) Appl. No.: 18/556,219

(22) PCT Filed: Apr. 21, 2022

(86) PCT No.: PCT/JP2022/018405
§ 371 (c)(1),
(2) Date: Oct. 19, 2023

(87) PCT Pub. No.: WO2022/225004
PCT Pub. Date: Oct. 27, 2022

(65) Prior Publication Data
US 2024/0221158 A1    Jul. 4, 2024

(30) Foreign Application Priority Data

Apr. 22, 2021    (JP) ................................. 2021-072344

(51) Int. Cl.
*G06T 7/00*        (2017.01)
*G06V 10/44*      (2022.01)
(Continued)

(52) U.S. Cl.
CPC ............ *G06T 7/0012* (2013.01); *G06V 10/44* (2022.01); *G06V 10/764* (2022.01);
(Continued)

(58) Field of Classification Search
CPC ......... G06T 7/0012; G06T 2207/10081; G06T 2207/10088; G06T 2207/30096;
(Continued)

(56) References Cited

U.S. PATENT DOCUMENTS 10,909,675 B2 *    2/2021    Hu ............................ G06T 7/11
2018/0025488 A1    1/2018    Chou et al.
(Continued)

FOREIGN PATENT DOCUMENTS

JP        2019-523065 A        8/2019
JP        2019-211307 A        12/2019
(Continued)

OTHER PUBLICATIONS

Louis DN, et al., The 2016 World Health Organization Classification of Tumors of the Central Nervous System, Acta Neuropathol (2016) 131:803-820.
(Continued)

*Primary Examiner* — Tom Y Lu
(74) *Attorney, Agent, or Firm* — Michael Best and Friedrich LLP

(57)        ABSTRACT

A diagnostic imaging assistance device 1 comprises: a first acquisition unit 10 for acquiring an image of a head through MRI; an image processing unit 11 for extracting a region containing information on a lesion site and the periphery of the lesion site from the acquired image of the head and generating a first image having the extracted region; an extraction unit 12 for extracting a predetermined image feature amount from the first image; a classification unit 14 for determining, on the basis of the image feature amount
(Continued)

extracted by the extraction unit 12, the presence or absence of a molecular biomarker associated with the lesion site for classification using a pre-constructed classifier; and a presentation unit 15 for presenting assistance information related to whether or not the lesion site contained in the image of the head has the molecular biomarker, on the basis of the result of the classification by the classification unit 14.

22 Claims, 13 Drawing Sheets

(51) Int. Cl.
*G06V 10/764* (2022.01)
*G06V 10/771* (2022.01)
(52) U.S. Cl.
CPC ...................... *G06V 10/771* (2022.01); *G06T 2207/10081* (2013.01); *G06T 2207/10088* (2013.01); *G06T 2207/30096* (2013.01)
(58) Field of Classification Search
CPC ........ G06T 7/00; G06V 10/44; G06V 10/764; G06V 10/771; A61B 5/055
See application file for complete search history.

(56) References Cited

U.S. PATENT DOCUMENTS

| | | | |
|---|---|---|---|
| 2019/0279362 A1 | 9/2019 | Callico et al. | |
| 2021/0097690 A1* | 4/2021 | Mostapha | G16H 50/20 |
| 2021/0196125 A1 | 7/2021 | Komori et al. | |
| 2022/0405932 A1* | 12/2022 | Gaskill-Shipley | A61B 5/055 |

FOREIGN PATENT DOCUMENTS

| | | |
|---|---|---|
| JP | 2019-537180 A | 12/2019 |
| JP | 2020-010804 A | 1/2020 |

OTHER PUBLICATIONS

Smith JS, Chang EF, Lamborn KR, et al., Role of extent of resection in the long-term outcome of low-grade hemispheric gliomas, J. Clin. Oncol., 26(8): 1338-45, 2008.

Sanai N, Polley MY, McDermott MW, et al., An extent of resection threshold for newly diagnosed glioblastomas, J. Neurosurg., 115(1):3-8, 2011.

Zhou H, Vallieres M, Bai HX, et al., MRI features predict survival and molecular markers in diffuse lower grade gliomas, Neuro-Oncology 19:862-870, 2017.

Kanazawa T, Fujiwara H, Takahashi H, et al., Imaging scoring systems for preoperative molecular diagnoses of lower-grade gliomas, Neurosurg. Rev., 42(2):433-441, 2019.

Kanazawa T, Minami Y, Takahashi H, et al., Magnetic resonance imaging texture analyses in lower-grade gliomas with a commercially available software: correlation of apparent diffusion coefficient and T2 skewness with 1p/19q codeletion, Neurosurg. Rev., (2020).

Fukuma R, Yanagisawa T, Kinoshita M, et al., Prediction of IDH and TERT promoter mutations in low-grade glioma from magnetic resonance images using a convolutional neural network, Sci. Rep., 9(1):20311, 2019.

Lasocki, Arian & Gaillard, Frank & Gorelik, Alexandra & Gonzales, M., MRI Features Can Predict 1p/19q Status in Intracranial Gliomas, American Journal of Neuroradiology, 2018, 39. 10.3174/ajnr.A5572.

* cited by examiner

IMAGE DIAGNOSSIS ASSISTANCE DEVICE, IMAGE DIAGNOSSIS ASSISTANCE METHOD, AND IMAGE DIAGNOSSIS ASSISTANCE PROGRAM

TECHNICAL FIELD

The present disclosure relates to an image diagnosis assistance device, an image diagnosis assistance method, and an image diagnosis assistance program.

BACKGROUND ART

In recent years, development of techniques for assisting image diagnosis is advancing; such techniques include analyzing, by using a computer, a medical image generated by MRI (Magnetic Resonance Imaging), CT (Computed Tomography), or the like for utilizing in diagnosis of presence/absence, the type, the stage, and so on of a disease.

Further, in recent years, machine learning techniques have been used in the field of image recognition, and a deep learning, which represents the machine learning technique has also been used in analysis of medical images.

For example, Patent Literature 1 discloses a technique of predicting, by using a technique of deep learning, a tomographic image of a brain in the future of a test subject based on a tomographic image of the brain of the same test subject. Further, Patent Literature 2 discloses a technique of using a hyper-spectrum image for performing, with a machine learning model, automatic segmentation of brain tissues in an image which is being captured, into tumors and normal tissues.

Further, Patent Literature 3 discloses a technique of using information representing types of brain tumors and multiple tomographic images obtained from a single patient, and using a learning model which has learned types of lesions relating to images of brain tumors, to thereby discriminate the type of a lesion with respect to each of the multiple tomographic images.

Further, Patent Literature 4 discloses a technique of performing whole tumor segmentation and multi-class tumor segmentation of a brain by using machine learning.

On a related note, molecular biology and molecular genetics are developing in recent years, and new techniques are expected for gaining understanding of and diagnosing pathologic states. Further, new techniques are expected for medical treatment using molecular-biological techniques and molecular-genetic techniques. The technique of molecular-genetic analysis has progressed in the field of brain tumors, and molecular-genetic pathological classification (WHO Classification of Tumor) has been newly introduced in the year 2016 (refer to Non-patent Literature 1).

The frequency of occurrence of primary brain tumors is 20 people/100,000 people/1 year; and, due to the particularity of such an internal organ, that is, the particularity of the brain, most of the brain tumors still remain to be fatal diseases. A Neuroglioma (glioma) is a representative malignant brain tumor which invasively grows in a brain, and ¼ to ⅓ among all primary brain tumors are primary brain tumors.

Especially for a glioma, it has been shown recently that treatment responses and vital prognosis can be predicted by taking into consideration genetic abnormality in a tumor; and, in the WHO Classification of Tumor of 2016, integrated diagnosis of morphological diagnosis and molecular diagnosis based on presence/absence of a representative molecular biomarker (genetic/chromosomal abnormality) was introduced in addition to prior-art classification based on tissue morphology.

Among the molecular biomarkers, 1p/19q codeletion which is deletion of both the short arm of chromosome 1 and the long arm of chromosome 19, and presence/absence of methylation in a promotor region in an MGMT gene are especially important as markers for forecasting chemotherapy response with respect to a tumor (refer to Non-patent Literature 1).

On the other hand, as for a glioma, treatments that involve surgical procedures of removing a largest possible area and then applying chemoradiotherapy are still practiced uniformly. That is, first, a safe and largest possible area associated with the brain tumor is removed by surgery, and, after the surgery, whether radiotherapy and chemotherapy is necessary is determined based on integrated pathological diagnosis; however, combined treatment using radiation and anticancer agents is performed internationally in most of medical facilities.

There are three reasons for the above-explained uniform treatment being common. The first reason being that, a treatment plan comprising determining the necessity and quantities of radiotherapy and chemotherapy is based on pathological diagnosis of a tumor tissue obtained by performing surgery for a glioma. The second reason being that, in a glioma, the rate of resection by surgery correlates to life prognosis (refer to Non-patent Literatures 2 and 3). Further, the third reason being that, although it is possible to perform biopsy and histology by endoscope techniques and local anesthesia in the cases of cancers in other organs; however in the cases of performing histology of brain tumors including a glioma, craniotomy, a very invasive technique becomes necessary.

In the case where presence of a glioma is expected and craniotomy is to be performed, the above-explained first and second reasons will be attempted to satisfy so that craniotomy for biopsy will be usually excluded. Thus, a neurosurgeon will be forced to remove a brain tumor as much as possible when the neurosurgeon is performing craniotomy. Further, in the case that a largest possible area associated with a brain tumor is removed, the degree of a risk of occurrence of dysfunction becomes higher. Further, although a brain is an organ that is extremely important to maintain functions, preoperative chemotherapy (neoadjuvant chemotherapy), that is used in the treatment of cancers in other organs, is not used in the treatment of brain tumors. Thus, as the first step of treatment of a glioma in order to improve life prognosis in the present situations, removal of a wide area associated to a brain tumor involving risk.

Neoadjuvant chemotherapy is a treatment strategy which involves collecting tissues by using an endoscope or the like; initially performing chemotherapy after the pathological diagnosis; and then performing extirpation after a progressed cancer region is being reduced (down-staging).

On the other hand, in recent years, it has been shown that a certain correlation exists between imaging finding in images generated by CT, MRI, or the like and an area where cancer started, and a tissue type (integrated pathological diagnosis) for example for a glioma (refer to Non-patent Literatures 4-7).

CITATION LIST

Patent Literature

PTL 1: Japanese Patent Application Public Disclosure No. 2019-211307

PTL 2: Japanese Patent Application Public Disclosure No. 2019-537180

PTL 3: Japanese Patent Application Public Disclosure No. 2020-010804

PTL 4: Japanese Patent Application Public Disclosure No. 2019-523065

Non Patent Literature

NPL 1: Louis D N, Ohgaki H, Wiestler O D, et al., World Health Organization Histological Classification of Tumours of the Central Nervous System, Revised 4th ed., Lyon, France: IARC; 2016

NPL 2: Smith J S, Chang E F, Lamborn K R, et al., Role of extent of resection in the long-term outcome of low-grade hemispheric gliomas, J. Clin. Oncol., 26(8):1338-45, 2008

NPL 3: Sanai N, Polley M Y, McDermott M W, et al., An extent of resection threshold for newly diagnosed glioblastomas, J. Neurosurg., 115(1):3-8, 2011

NPL 4: Zhou H, Vallieres M, Bai H X, et al., MRI features predict survival and molecular markers in diffuse lower grade gliomas, Neuro-Oncology 19:862-870, 2017

NPL 5: Kanazawa T, Fujiwara H, Takahashi H, et al., Imaging scoring systems for preoperative molecular diagnoses of lower-grade gliomas, Neurosurg. Rev., 42(2):433-441, 2019

NPL 6: Kanazawa T, Minami Y, Takahashi H, et al., Magnetic resonance imaging texture analyses in lower-grade gliomas with a commercially available software: correlation of apparent diffusion coefficient and T2 skewness with 1p/19q codeletion, Neurosurg. Rev., 2019 Aug. 11

NPL 7: Fukuma R, Yanagisawa T, Kinoshita M, et al., Prediction of IDH and TERT promoter mutations in low-grade glioma from magnetic resonance images using a convolutional neural network, Sci. Rep., 9(1):20311, 2019

NPL 8: Lasocki, Arian & Gaillard, Frank & Gorelik, Alexandra & Gonzales, M., MRI Features Can Predict 1p/19q Status in Intracranial Gliomas, American Journal of Neuroradiology, 2018, 39. 10.3174/ajnr.A5572

SUMMARY OF INVENTION

Technical Problem

On the other hand, each of the techniques disclosed in Patent Literatures 1-3 for analyzing medical images is not constructed for the purposes of predicting the presence/absence of molecular biomarkers such as gene mutation and the like of a brain tumor. Further, in the prior-art techniques, when performing pathological diagnosis of a brain tumor such as a glioma or the like and/or prediction of gene mutation based on imaging finding, it is difficult to satisfy the specificity and sensitivity, objectivity, and versatility, so that the clinical applications have not been achieved.

As explained above, according to the prior-art techniques, it is difficult to predict with high precision, the presence/absence of molecular biomarkers in a brain tumor based on an image of a head.

The present disclosure has been achieved for solving the above-explained problems, and an object of the present disclosure is to predict with high precision, presence/absence of molecular biomarkers in a brain tumor based on an image of a head.

Solution to Problem

For solving the above problems, an image diagnosis assistance device according to the present disclosure comprises: an acquisition unit for obtaining an image of a head generated by MRI; an image processor for extracting, from the obtained image of the head, a region containing information on a lesion and a peripheral margin of the lesion, and generating a first image containing the extracted region; an extractor for extracting predetermined image features from the first image; a classification unit for classifying, based on the image features extracted by the extractor, a presence/absence of a molecular biomarker associated with the lesion using a classifier constructed in advance; and a presentation unit for presenting, based on a result of classification from the classification unit, assistance information relating to whether or not the lesion contained in the image of the head has the molecular biomarker.

For solving the above problems, an image diagnosis assistance device according to the present disclosure comprises: an acquisition unit for obtaining an image of a head generated by MRI; an image processor for extracting, from the obtained image of the head, a region containing information on a lesion and a peripheral margin of the lesion, and generating a first image containing the extracted region; an extractor for extracting predetermined image features from the first image, and selecting, from the extracted image features, image features that satisfy a condition that is set based on a degree of importance that represents a degree of relevance to a molecular biomarker; a classification unit for classifying, based on the image features selected by the extractor, a presence/absence of the molecular biomarker associated with the lesion using a classifier constructed in advance; and a presentation unit for presenting, based on a result of classification from the classification unit, assistance information relating to whether or not the lesion contained in the image of the head has the molecular biomarker.

Further, the image diagnosis assistance device according to the present disclosure may comprise a selector for selecting, from the image features extracted by the extractor, image features that satisfy a condition that is set; wherein the condition that is set includes a condition that is set based on a degree of importance representing a degree of relevance between each image feature extracted by the extractor and the molecular biomarker, and the classification unit classifies the presence/absence of the molecular biomarker in the lesion for the image features selected by the selector.

Further, in the image diagnosis assistance device according to the present disclosure, the degree of importance is obtained by a learning model learned in advance, the degree of relevance between an image feature and the molecular biomarker.

Further, in the image diagnosis assistance device according to the present disclosure, the degree of importance is obtained by learning of the learning model, wherein a presence/absence of calcification in the lesion in a CT image of the head corresponding to the image of the head is taken into consideration in the learning.

Further, in the image diagnosis assistance device according to the present disclosure, the degree of importance is obtained by learning of the learning model, wherein age of a test subject of the image of the head and localization information of the lesion in the head are taken into consideration in the learning.

Further, in the image diagnosis assistance device according to the present disclosure, the learning model may comprise any of a random forest, a gradient boosting tree, and a LASSO model.

Further, in the image diagnosis assistance device according to the present disclosure, the image processor uses a FLAIR image in images of the head generated by MRI, extracts, from the image of the head, a region containing the lesion and generates the first image.

Further, in the image diagnosis assistance device according to the present disclosure, the extractor extracts the image features by performing radiomics analysis of the first image.

Further, in the image diagnosis assistance device according to the present disclosure, the classifier may comprise any of a support vector machine, a random forest, and a gradient boosting tree.

Further, in the image diagnosis assistance device according to the present disclosure, the lesion indicates a glioma, and the molecular biomarker associated with the lesion is 1p/19q codeletion.

Further, in the image diagnosis assistance device according to the present disclosure, the presentation unit displays, on a display screen, the image of the head, the first image, and the assistance information relating to whether or not the lesion contained in the image of the head has the molecular biomarker based on the result of classification.

Further, for solving the above problems, a first step of obtaining an image of a head generated by MRI; a second step of extracting, from the obtained image of the head, a region containing information on a lesion and a peripheral margin of the lesion, and generating a first image containing the extracted region; a third step of extracting predetermined image features from the first image; a fourth step of performing, based on the image features extracted in the third step, classification of a presence/absence of a molecular biomarker associated with the lesion using a classifier constructed in advance; and a fifth step of presenting, based on a result of classification in the fourth step, assistance information relating to whether or not the lesion contained in the image of the head has the molecular biomarker.

Further, the image diagnosis assistance method according to the present disclosure may further comprise a sixth step of selecting, from the image features extracted in the third step, image features that satisfy a condition that is set; wherein the condition that is set includes a condition that is set based on a degree of importance representing a degree of relevance between each image feature extracted in the third step and the molecular biomarker, the degree of importance is obtained from a learning model learned in advance, the degree of relevance between an image feature and the molecular biomarker, and in the fourth step, the presence/absence of the molecular biomarker in the lesion is classified for the image features selected in the sixth step.

Further, for solving the above problems, an image diagnosis assistance program according to the present disclosure causes a computer execute: a first step of obtaining an image of a head generated by MRI; a second step of extracting, from the obtained image of the head, a region containing information on a lesion and a peripheral margin of the lesion, and generating a first image containing the extracted region; a third step of extracting predetermined image features from the first image; a fourth step of classifying, based on the image features extracted in the third step, a presence/absence of a molecular biomarker associated with the lesion using a classifier constructed in advance; and a fifth step of presenting, based on a result of classification in the fourth step, assistance information relating to whether or not the lesion contained in the image of the head has the molecular biomarker.

Further, the image diagnosis assistance program may further causes the computer to execute a sixth step of selecting, from the image features extracted in the third step, image features that satisfy a condition that is set; wherein the condition that is set includes a condition that is set based on a degree of importance representing a degree of relevance between each image feature extracted in the third step and the molecular biomarker, the degree of importance is obtained from a learning model learned in advance, the degree of relevance between an image feature and the molecular biomarker, and in the fourth step, the presence/absence of the molecular biomarker in the lesion is classified for the image features selected in the sixth step.

Advantageous Effects of Invention

According to the present disclosure, a region containing information on a lesion and a peripheral margin of the lesion is extracted from an image of a head, a first image containing the extracted region is generated, and, based on predetermined image features extracted from the first image, the presence/absence of a molecular biomarker associated with the lesion is classified using a classifier constructed in advance. Accordingly, a high precision prediction of the presence/absence of a molecular biomarker of a brain tumor based on an image of a head is achieved.

DESCRIPTION OF EMBODIMENTS

Figure 1:
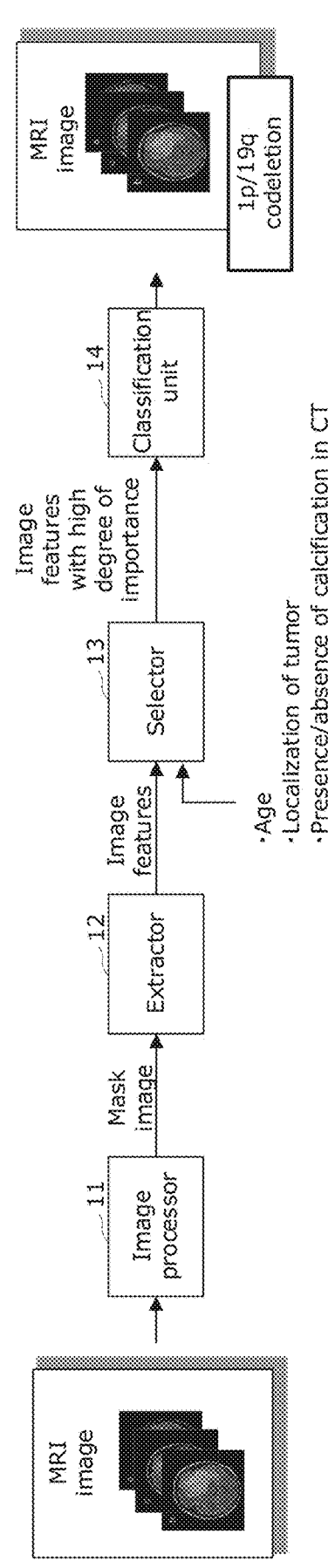
FIG. 1 is a block diagram showing an outline of a structure of an image diagnosis assistance device according to an embodiment of the present disclosure.

In the following description, preferred embodiments of the present disclosure will be explained in detail with reference to FIG. 1 to FIG. 14.

Outline of Present Disclosure

First, an outline of an image diagnosis assistance device 1 according to an embodiment of the present disclosure will be explained.

The image diagnosis assistance device 1 according to an embodiment of the present disclosure is a device for assisting image diagnosis by inferring a molecular-biological features of a brain tumor using machine learning techniques, based on an image of a head captured prior to surgery. The molecular-biological features of a brain tumor inferred by image diagnosis assistance device 1 allow for an image diagnosis assistance for a suitable design of a comprehensive treatment strategy, and a surgery strategy prior to craniotomy including determining which region in a tumor to be resected and so on. That is, although the conventional treatments of a brain tumor are based on pathological diagnosis of a resected tumor, the image diagnosis assistance device 1 enables designing of a treatment strategy based on image diagnosis for grade-2 or grade-3 glioma.

As explained above, three molecular biomarkers, that is, 1p/19q codeletion, presence/absence of methylation in a promotor region in a DNA repair enzyme MGMT gene, and presence/absence of mutation in an IDH 1/2 gene, are known to be important factors associated with treatment responsiveness and prognosis for a glioma. Especially, the sensitivity to chemotherapy is higher for the glioma with 1p/19q codeletion so that the presence/absence of the chromosomal abnormality is very important when determining the treatment strategy.

Among these three important molecular biomarkers, the presence/absence of 1p/19q codeletion is being focused on and utilized in the image diagnosis assistance device 1 in the present embodiment. That is, the image diagnosis assistance device 1 according to the present embodiment performs inference of whether or not the lesion has 1p/19q codeletion based on an image containing a region suspected of a glioma.

As a result of a high precision and specificity of the inference of the presence/absence of 1p/19q codeletion in the glioma performed based only on imaging finding without relying on the conventional pathological diagnosis, predictions of good chemotherapy responses, and more suitable treatment assistance for the glioma can be accomplished.

In order to enable an inference of the presence/absence of a molecular biomarker based on imaging finding in the manner explained above, the image diagnosis assistance device 1 according to the present embodiment of the present disclosure adopts an algorithm based on machine learning. More specifically, the image diagnosis assistance device 1 performs inference of presence/absence of 1p/19q codeletion in unknown image data of a head, which contains a lesion associated with a glioma, by using a trained machine learning model constructed using training data. As for the training data, a data set consisting of images of heads that contain lesions associated with gliomas, and ground-truth labels that indicate presence/absence of 1p/19q codeletion are provided to the images being used.

In more detail, as shown in FIG. 1, for example, the image diagnosis assistance device 1 according to the present embodiment performs radiomics analysis of images of a head generated by MRI, and extracts high dimensional image features relating to the texture such as homogeneity, quality, and the like, the size, the shape, and the like of a lesion. The image features such as those shown above are referred to as radiomics features, and are information that is understood to have a relevance to clinical information of a lesion such as a glioma.

Regarding a region of interest set in an image, from which an image feature is to be extracted, an area containing extensive information of a peripheral margin of a tumor is set as the region of interest. This is based on novel knowledge that information of a peripheral margin of a tumor, i.e., a region including a border between a lesion and a normal region, provides important information for inferencing of the presence/absence of a molecular biomarker. The image features are extracted from a mask image containing this region of interest.

Further, the extracted image features are classified using a classifier which has learned as to whether 1p/19q codeletion is present or absent based on image features in training data. As for the classifier, a machine learning model applicable to a classification problem, such as a support vector machine (SVM), a random forest, a gradient boosting, or the like, can be used. As an example in the embodiment of the present disclosure, the SVM is used.

Among the image features extracted by the radiomics analysis, specific types of image features that satisfy predetermined conditions are supplied as input to the SVN. More specifically, specific types and number of image features, that satisfy conditions that have been set based on the degrees of importance of image features representing the relevance between the respective image features and 1p/19q codeletion, are selected and input to the trained SVM. In this regard, the degrees of importance are obtained as a result of a learning process performed in advance in an external server or the like.

The learning model which learns the degrees of importance is operated to perform learning based on image features extracted from mask images of training data in addition to information known to have greater relevance to the inferencing of the presence/absence of 1p/19q codeletion. For example, learning is performed by using, as input data, information including the age of a patient associated with an image of a head to be analyzed, and localization information of a tumor.

Further, based on a result of classification by the classifier, assistance information relating to whether or not a lesion of a glioma contained in the image of a head has 1p/19q codeletion is presented.

For example, by performing the inference of whether or not a glioma has 1p/19q codeletion based on an image of a head obtained prior to surgery, it becomes possible to construct specific treatment strategies as indicated in following items 1) to 3). 1) At the time of first surgery, a peripheral area close to the regions very important to the brain functions, such as regions associated with motor, language, and so on, are deliberately avoided for a resection to avoid risks, and instead, a partial resection is intentionally performed; thereafter, chemotherapy is being administered to reduce the size of the tumor; and, thereafter, the tumor close to the peripheral region associated with the functions is being resected. 2) First, chemotherapy is being administered without surgery, i.e., without performing histology; and the tumor is resected after the size of the tumor being reduced. 3) A sustained-release agent of an intracerebrally-indwelling anticancer-agent is intentionally placed. By allowing these treatment strategies as explained above, lowering of risks relating to surgery and adverse drug reactions, a reduction of the size in a resection area of a brain, and improvement in the rate of resection, and an improvement in the functional prognosis and life prognosis, and so on can be expected.

Embodiments

Figure 2:
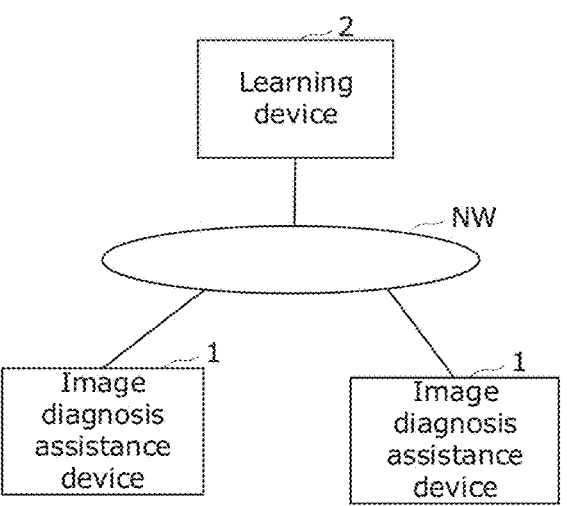
FIG. 2 is a block diagram showing an example of a structure of an image diagnosis assistance system comprising an image diagnosis assistance device according to an embodiment of the present disclosure.

FIG. 2 is a block diagram showing an outline of a structure of an image diagnosis assistance system comprising the image diagnosis assistance device 1 according to an embodiment of the present disclosure. The image diagnosis assistance system performs, based on an image of a head generated by MRI, an inference of whether a brain tumor contained in the image has a molecular biomarker, and presents a result of the inference as assistance information for the image diagnosis.

As shown in FIG. 2, the image diagnosis assistance system comprises, for example, multiple image diagnosis assistance devices 1 and a learning device 2. The image diagnosis assistance devices 1 and a learning device 2 are connected with one another, for example, via a network NW such as the Internet or the like.

The learning device 2 learns, based on training data of images of heads generated by MRI, whether a lesion of a glioma contained in an image has 1p/19q codeletion, and constructs a first model M1 and a second model M2 which will be explained later. Note that the first model M1 and the second model M2 may be collectively referred to as a learning model.

The image diagnosis assistance device 1 loads a learning model constructed by the learning device 2, and, based on an image of a head generated by MRI, performs an inference of the presence/absence of 1p/19q codeletion in a lesion contained in the image. The image diagnosis assistance device 1 can obtain a learning model from, for example, the learning device 2 via the network MW. In a different example, the image diagnosis assistance device 1 can obtain a learning model from a portable semiconductor memory such as a USB memory, which is a representative of a portable semiconductor memory, or the like.

For example, the image diagnosis assistance device 1 is installed in a medical facility such as a hospital, and performs, using an MRI image of a head of a patient, an inference of whether a lesion associated with a glioma has 1p/19q codeletion, and presents results of inference as assistance information for image diagnosis.

In this regard, the image diagnosis assistance system may be constructed in such a manner that the learning device 2 performs a re-learning to update the learning model based on the results of inference of an MRI image of a head for new cases in the image diagnosis assistance device 1.
(Functional Blocks of Image Diagnosis Assistance Device) Next, functional structures of the image diagnosis assistance device 1 will be explained with reference to FIG. 3.

The image diagnosis assistance device 1 comprises a first acquisition unit 10 (acquisition unit), an image processor 11, an extractor 12, a selector 13, a classification unit 14, a presentation unit 15, and a memory 16.

The first acquisition unit 10 obtains an image of a head generated by MRI. In more detail, the first acquisition unit 10 obtains an image set comprising three types of images, specifically, a T2 weighted image, a TiCE image, and a FLAIR image of a head of a patient generated by MRI. For example, the first acquisition unit 10 can obtain multiple T2 weighted images, multiple TiCE images, and multiple FLAIR images, each containing a region suspected of a glioma. Each of the multiple images is an MRI image that is obtained by scanning the whole brain from the base of the brain to the vertex. The first acquisition unit 10 may additionally obtain a CT image of a head of a patient from whom MRI images have been obtained.

A T2 weighted image is an image in which water, liquid components and cysts, in addition to adipose tissues appear white, and a tumor is visualized in such a manner that typically it has a slightly white color. A TiCE image is an image in which adipose tissues appear mainly white, and water, liquid components, and cysts are visualized in such a manner that each of them has a black color. In a TiCE image, a tumor part is visualized in such a manner that typically it has a black color, and an area where a large amount of blood is flowing is visualized in such a manner that it has a white color due to enhancement effect of a contrast agent. Further, a FLAIR (fluid-attenuated inversion-recovery) image may be defined as a T2 weighted image in which signals of water are suppressed, and, in the image, a spinal fluid is depicted in such a manner that it has a black color, i.e., it corresponds to a low signal.

The image processor 11 extracts, from an image of a head obtained by the first acquisition unit 10, a region of interest that is a region containing information on a lesion associated with a glioma and a peripheral margin of the lesion, and generates a mask image (a first image) containing the extracted region. The term "a peripheral margin of the lesion" means an area including the border between a lesion and a normal region. More specifically, the image processor 11 can use a FLAIR image obtained by the first acquisition unit 10 to extract an abnormal region containing a lesion in the FLAIR image, and generate a mask image. Further, in a yet different example, the image processor 11 can set, as a region of interest, a region containing a lesion associated with a glioma, a peripheral margin of the lesion, and a region that extends from the peripheral margin towards outside thereof by up to approximately 5 mm, and generate a mask image accordingly.

In addition, the image processor 11 may perform a well-known preprocessing, adjusting of the image size, and so on to the MRI images obtained by the first acquisition unit 10. Further, as for the mask image generated by the image processor 11, adjustments and corrections in response to input operation performed externally can be carried out as appropriate.

The extractor 12 extracts image features from a mask image of a region of interest generated by the image processor 11. Specifically, the extractor 12 performs radiomics analysis of a mask image, and extracts predetermined types of image features. The radiomics analysis is a technique for comprehensive analysis of a large quantity of image features obtained in a large-scale medical image database. The image features, that is the quantified features in images obtained by the radiomics analysis of the size and shape of a lesion, concentration, strength of signals from the lesion, texture such as nonuniformity, and so on contained in the image, indicate information having certain correlations with clinical evaluation of a lesion. The extractor 12 can extract, according to a setting thereof, a predetermined number of image features by using PyRadiomics that is an open source of radiomics analysis; however, the structure thereof is not limited to that explained above. For example, image features may be extracted using a deep learning model, and an example thereof is a convolutional neural network such as VGG19 or the like.

The selector 13 selects image features that satisfy set conditions from the image features extracted by the extractor 12, and sends them to the classification unit 14. The set conditions are set in advance based on the degrees of importance of image features that represents the degree of relevance between respective image features extracted by the extractor 12 and 1p/19q codeletion. The degree of importance is a value that may be obtained for each image feature, and can be respectively ranked. Further, the degree of importance is a value obtained as a result of learning of the first model M1 carried out by the externally provided learning device 2. The learning process relating to the degree of importance will be explained later. The set conditions are stored in the selection conditions 16C in the memory.

For example, in addition to 93 image features extracted by the extractor 13, the selector 13 selects specific types and specific numbers of image features from information where correlation with 1p/19q codeletion is observed, and set them as input to the learned second model M2. Specifically, as for the information where correlation with 1p/19q codeletion is observed, localization information of a tumor and the age of a patient in connection to an image of a head to be analyzed, may be selected by the selector 13.

Localization information of a tumor is a value that represents an anatomical location of a tumor that is set in advance, where the anatomical locations being a frontal lobe, an occipital lobe, a temporal lobe, a deep part, and so on. It has been known that localization of a tumor is associated with the genetic background of the tumor. For example, the brain tissue can be classified to 10 areas, specifically, "frontal: 1," "temporal: 2," "parietal: 3," "occipital: 4," "insular: 5," "diencephalon: 6," "corpus callosum: 7," "brainstem: 8," and "cerebellum: 9," "multicentric: 10," and that values 1 to 10 assigned to the above respective areas can be used. In case where a lesion extends across multiple areas, a value of an area where a main lesion is located may be used. Further, as for the classification of localization, an examiner, a physician who actually uses the image diagnosis assistance device 1 may determine and use the determined classifications.

The selector 13 may further select, according to the set conditions, information representing whether or not calcification in a lesion associated with a glioma in a CT image of a head exists, as information where correlation with 1p/19q codeletion is observed. Presence/absence of calcification in a lesion in a CT image represents information that is known to be associated with 1p/19q codeletion. Further, information of a peripheral margin of a lesion associated with a glioma is considered to having relevance to the presence/absence of a molecular biomarker such as 1p/19q codeletion or the like.

The age of a patient, localization information of a tumor, and information regarding presence/absence of calcification in a CT image is tied to identification information such as an ID of a patient in connection to an image of a head to be analyzed, and stored in advance in the additional data 16B in the memory 16. The features stored in the additional data 16B may also be referred to as image features.

For example, the selector 13 may select, from extracted 93 image features and according to conditions that have been set, 15 or a certain number of image features having higher degree of importance in specific types of image features. In a different construction, the selector 13 may select according to the set conditions, 15 or a certain number of image features among the age of patients, localization information of tumors, and information regarding presence/absence of calcification in CT images, in addition to 93 image features.

The classification unit 14 performs, based on the image features selected by the selector 13, classification of whether or not a lesion of a glioma has 1p/19q codeletion. The classification unit 14 classifies using the second model M2 that is a classifier learned and constructed in advance of the presence/absence of 1p/19q codeletion in image features. A linear SVM, a random forest, or the like may be used for the second model M2. More specifically, the classification unit 14 uses, as input thereto, specific types of image features such as 15 or 17 image features selected based on the degree of importance, and classifies whether the features have 1p/19q codeletion by calculating the learned linear SVM or random forest. The gradient boosting or the like may be used for the second model M2, instead of the linear SVM and the random forest.

The presentation unit 15 presents, based on the result of classification performed by the classification unit 14, assistance information relating to whether or not a lesion associated with a glioma contained in an image of a head has 1p/19q codeletion. For example, the presentation unit 15 may apply a threshold value to a classification result which is being obtained as a predicted probability value, and use the threshold value being set by taking into consideration a prevalence rate and so on, to determine whether or not a lesion has 1p/19q codeletion, and present a result thereof as assistance information for image diagnosis. In a different construction, the presentation unit 15 may present, based on a value obtained from classification result and in an either-or format, information on whether or not a lesion has 1p/19q codeletion as assistance information.

For example, the presentation unit 15 can display, by using a display device 108 which will be explained later, assistance information representing whether or not a lesion has 1p/19q codeletion along with text data, the image of the head, and so on. Note that any presentation method can be adopted as long as assisting of image diagnosis is possible, and thus the information to be presented by the presentation unit 15 is not limited to visual information, and the assistance information to be presented may be in the form of sound or the like.

The memory 16 comprises regions for storing an inference program 16A, the additional data 16B, the selection conditions 16C, and the second model M2, respectively.

The inference program 16A is a program that causes respective functional units including the extractor 12, the selector 13, and the classification unit 14 in the image diagnosis assistance device 1 to perform inference of whether a lesion associated with a glioma contained in an image of a head of a patient has 1p/19q codeletion, based on the degree of importance obtained via the second model M2 and the first model M1 respectively constructed in advance.

The additional data 16B stores the age of patients, the localization information of tumors, and the presence/absence of calcification in CT images, which are selectable when inputs to the learned second model M2 are being selected by the selector 13 based on the set conditions.

The selection conditions 16C stores set conditions used by the selector 13.

The second model M2 is a learned classifier used by the classification unit 14.

(Functional Blocks of Learning Device)

Next, a structure of the learning device 2 included in the image diagnosis assistance system will be explained with reference to FIG. 4.

Figure 3:
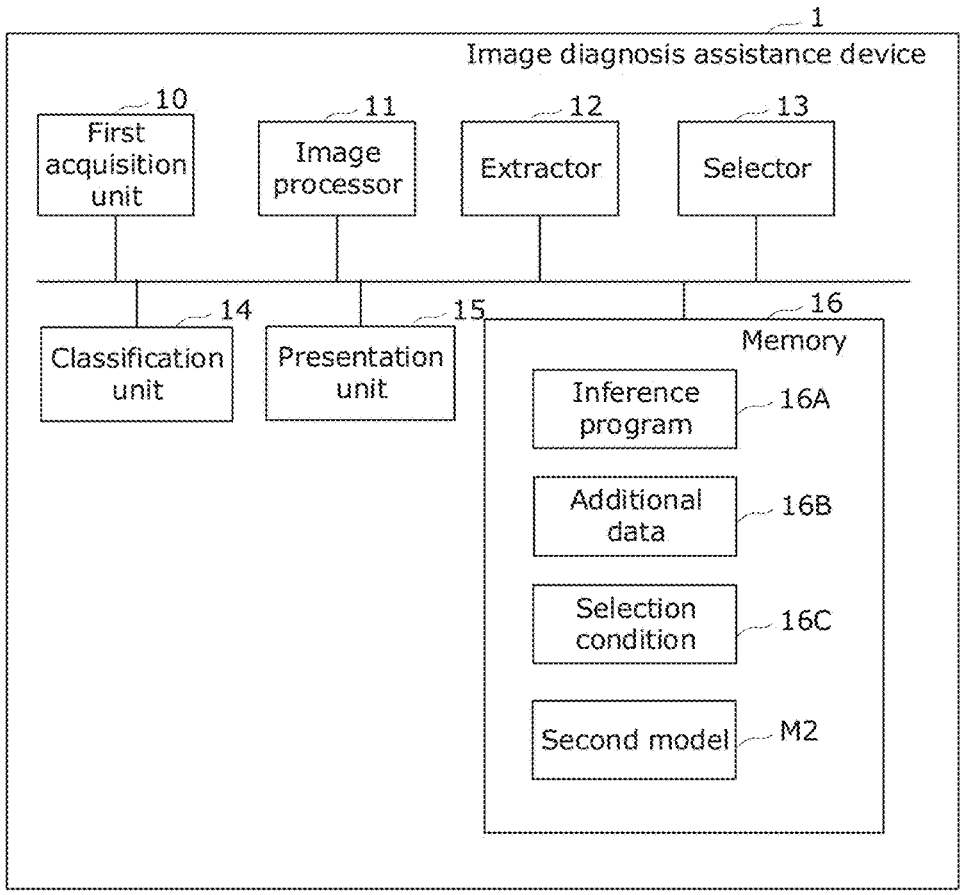
FIG. 3 is a block diagram showing a structure of an image diagnosis assistance device according to the present embodiment.

The learning device 2 comprises structures corresponding to the first acquisition unit 10, the image processor 11, the extractor 12, and the classification unit 14 which have been explained with reference to FIG. 3, and performs a learning process for the first model M1 which learns the degree of importance for determining the selection conditions used by the selector 13, and carries out a learning process for the second model M2 that is a classifier used by the classification unit 14. The learning device 2 comprises, for example, a second acquisition unit 20, an image processor 21, a setting unit 22, a learning unit 23, and a memory 24.

The second acquisition unit 20 obtains, from a training data DB 205, training data containing images of heads generated by MRI and ground-truth labels given to the images, which indicate presence/absence of 1p/19q codeletion. Specifically, the above is the training data containing an image set which contains three types of images, i.e., a T2 weighted image, a T1CE image, and a FLAIR image of a head, to which the presence/absence of 1p/19q codeletion is being labelled. As for the example of training images used as the training data, 159 examples of gliomas available from The Cancer Image Archive (TCIA), and, for example, 100 examples of other available primary glioma cases may be used. The second acquisition unit 20 may also obtain a CT image of a head.

The image processor 21 extracts as a region of interest, from the images contained in the training data obtained by the second acquisition unit 20, a region containing information on a lesion associated with a glioma and a peripheral margin of the lesion, and generates a mask image containing the extracted region. More specifically, the image processor 21 can generate a mask image using a FLAIR image obtained by the second acquisition unit 20, i.e., by extracting an abnormal region which contains a lesion from the FLAIR image. In a different example, the image processor 21 can set, as a region of interest, a region containing a lesion associated with a glioma, a peripheral margin of the legion, and a region that extends from the peripheral margin towards outside thereof by up to approximately 5 mm, and generate a mask image accordingly. The adjustments and corrections in response to input operation provided from the external source can be carried out as appropriate for the mask image generated by the image processor 21.

The setting unit 22 carries out, in response to the input received from the external source, setting of the learning model, such as setting of hyperparameters and so on for the learning processes of the learning unit 23. For example, the setting unit 22 sets structures of the first mode M1 which learns the degrees of importance to determine the selection conditions used by the selector 13. The setting unit 22 sets the first model M1 to use, for example, a gradient boosting decision tree as a learning model thereof. The first model M1 set by the setting unit 22 may comprise other learning model such as, for example, a random forest, a LASSO model, or the like, instead of a gradient boosting.

Further, for example, in the case where a gradient boosting is adopted in the first model M1, the setting unit 22 carries out setting of the structure of the decision tree of the gradient boosting, and setting of the input nodes of the gradient boosting decision tree. For example, the setting unit 22 carries out setting of the number of image features input to the gradient boosting, and setting of designation of additional input data, for example, the age, localization information of tumors, and presence/absence of calcification in CT images, which are used along with the image features.

Further, in the case where a linear SVM is employed as a classifier used in the classification unit 14 to perform classification of the presence/absence of 1p/19q codeletion, the setting unit 22 designates a linear kernel as a kernel function in the linear SVM. Further, the setting unit 22 sets, for example, the number of folds in cross-validation performed in the liner SVM. As for the number of pieces of input data to the linear SVM, the setting unit 22 can set conditions to use the top 17 specific image features in the order of higher degrees of importance, based for example on the degree of importance obtained as a result of learning of the first model M1. The set conditions are stored in the selection condition 24C. The setting unit 22 may use a classifier that utilizes a random forest, a gradient boosting, or the like, instead of an SVM.

Further, the setting unit 22 specifies image features that are to be extracted by the radiomics analysis of images of heads generated by MRI, and sets of the number of image features. For example, the setting unit 22 may set the number of extracted image features to be 93.

The learning unit 23 performs, according to a learning program 24A stored in the memory 24 and by using training images, learning of the first model M1 which learns the degree of importance to determine the selection conditions that are being used when the selector 13 selects image features, and performs learning of the second model M2 for classifying the presence/absence of 1p/19q codeletion used in the classification unit 14, and thereby constructs the learned first model M1 and the learned second model M2, respectively. In the following description, the explanation will be made in which a gradient boosting is being used as the first model M1 and an SVM is being used as the second model M2.

More specifically, the learning unit 23 performs radiomics analysis for the mask images in the training images contained in the teacher data to extract, for example, 93 image features. Further, depending on the extracted image features in the training images, the age, the localization information of tumors, and the settings, the learning unit 23 performs learning using the gradient boosting and based on the presence/absence of calcification in CT images of tumors, to learn the degree of importance that represents the degree of relevance to the 1p/19q codeletion.

In the following description, learning of the first model M1 by the learning unit 23, i.e., learning of the degree of importance, will be explained in detail. The learning unit 23 inputs, to the gradient boosting that has been set as the first model M1, image features that have been extracted from the training mages by the radiomics analysis. The learning unit 23 can learn the degree of importance by suppling, to the gradient boosting and as input thereto, information where correlation to 1p/19q codeletion in being observed in addition to the extracted image features.

For example, the age of a patient and localization information of a tumor of the patient in connection to the training image of a head to be analyzed may be used as the information where correlation with 1p/19q codeletion is being observed. Localization information of a tumor is a value that represents an anatomical location of a tumor set in advance, which is known to have relevance to the genetic background of the tumor.

Further, information representing whether or not calcification has occurred in a lesion associated with a glioma in a CT image of a head may be further utilized as the information where correlation with 1p/19q codeletion is observed. It is considered that a CT image of a head, which contains information on a peripheral margin of a lesion associated with a tumor, has relevance to the presence/absence of a molecular biomarker such as 1p/19q codeletion or the like. Based on such knowledge, learning of the first model M1 may be carried out by taking into consideration the presence/absence of calcification in a lesion associated with a glioma in a CT image.

As explained above, the learning unit 23 allows the first model M1 to carry out learning of the degree of importance between respective image features and 1p/19q codeletion using the gradient boosting or the like. As for the 93 image features extracted from the training images by the radiomics analysis, age, localization information of tumors, and the presence/absence of calcification in CT images, the learned first model M1 outputs the degree of importance for these features in the form of ranked values in the order of degree of importance. The setting unit 22 will set the selection condition 24C for the learned degree of importance.

The learning unit 23 loads, from the selection condition 24C in the memory 24, the conditions set by the setting unit 22 based on the degree of importance obtained via learning of the first model M1. For example, the selection condition 24C specifies that 15, or 17 or other specific numbers of image features in specific types of image features to be selected in the order of higher degree of importance. The selected 15 or 17 image features in the specific types of image features including age, localization information of tumors, and the presence/absence of calcification in CT images, for example, are used as input to the second model M2. The learning unit 23 selects image features that satisfy the set conditions, among the image features extracted by the radiomics analysis, and the age, the localization information of tumors, and the presence/absence of calcification in CT images that are included in additional data 24B.

Based on the degrees of importance obtained via learning of the first model M1, the learning unit 23 supplies image features that satisfy the set conditions, to the second model M2 as input thereto, and causes the second model M2 to perform learning. Specifically, the learning unit 23 carries out learning of a linear SVM which classifies whether or not an image feature has 1p/19q codeletion based on the ground-truth labels indicating the presence/absence of 1p/19q codeletion provided with the training images of the image features, and constructs a learned linear SVM accordingly.

The memory 24 stores the learning program 24A, the additional data 24B, the selection condition 24C, the first model M1, and the second model M2.

The learning program 24A is a program which uses training data containing training images, that contains images of heads generated by MRI, and ground-truth labels given to the images for the inferencing of whether or not a lesion associated with a glioma has 1p/19q codeletion. The learning unit 23 constructs, according to the learning program 24A, a learning model by causing the first model M1 and the second model M2 to perform learning, and stores the learned first model M1 and the learned second model M2 in the memory 24.

The additional data 24B includes information such as age, localization information of tumors, presence/absence of calcification in CT images of tumors, and so on, and which are supplied as input to the first model M1 such as a gradient boosting for obtaining the degree of importance of image features extracted from mask images and selecting the image features accordingly.

The selection condition 24C stores conditions that have been set based on the degree of importance of image features obtained via learning of the first model M1.

(Hardware Structure of Image Diagnosis Assistance Device)

Next, an example of a hardware structure for realizing the image diagnosis assistance device 1 according to the present embodiment will be explained by reference to the block diagram in FIG. 5.

Figure 5:
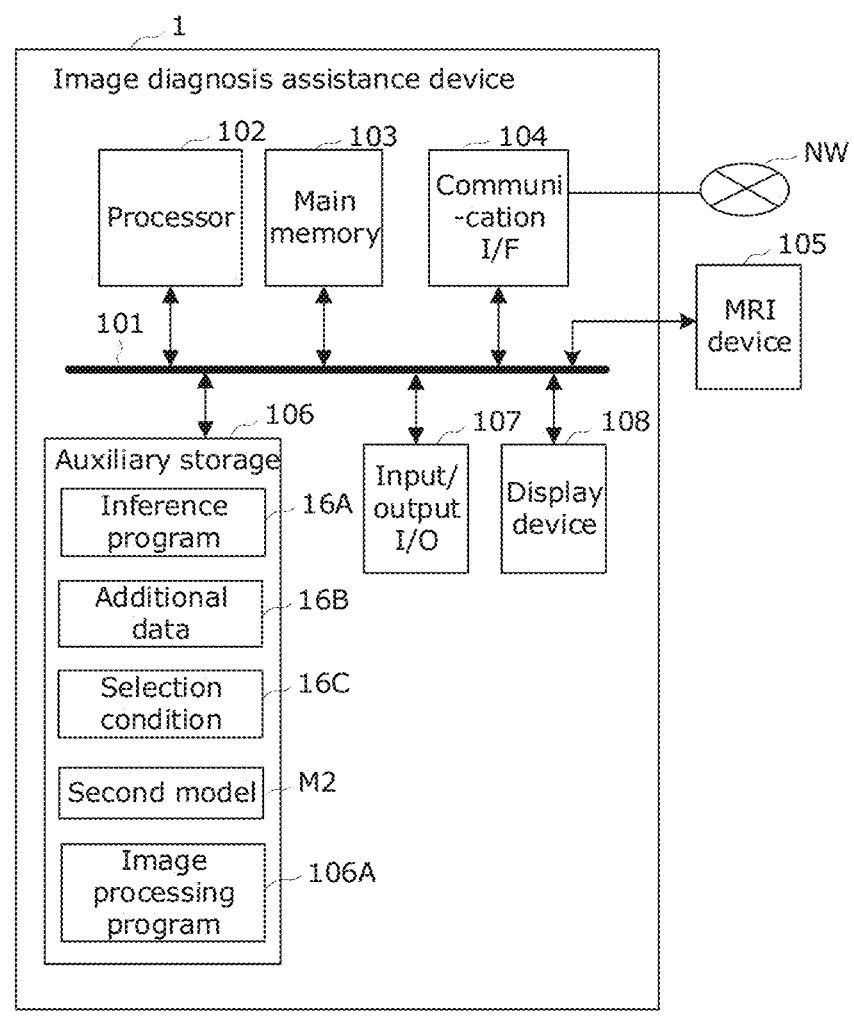
FIG. 5 is a block diagram showing an example of a hardware structure of an image diagnosis assistance device according to the present embodiment.

As shown in FIG. 5, the image diagnosis assistance device 1 may be realized, for example, by a computer which comprises a processor 102, a main memory 103, a communication interface (I/F) 104, an auxiliary storage 106, and an input/output I/O 107 which are connected via a bus 101, and a program for controlling the above hardware resources. Further, the image diagnosis assistance device 1 is connected to an external MRI device 105 via the bus 101. Further, the image diagnosis assistance device 1 may comprise a display device 108 connected thereto via the bus 101.

The main memory 13 stores, in advance, programs that causes the processor to perform various types of controls and operations. Various types of functions of the image diagnosis assistance device 1, such as the first acquisition unit 10, the image processor 11, the extractor 12, the selector 13, the classification unit 14, and so on, which are shown in FIG. 2, are realized by the processor 102 and the main memory 103.

The communication I/F 104 is an interface circuit used for network connection between the image diagnosis assistance device 1 and various types of external electronic devices. The first acquisition unit 10, the presentation unit 15 and so on, which are shown in FIG. 2, are realized by the communication I/F 104. Note that it is possible to adopt a structure in which the additional data 16B and the selection condition 16C used by the selector 13, and the second model M2 used by the classification unit 14 explained in FIG. 2, are received from an external terminal such as the learning device 2 by the communication I/F 104 via the network NW.

The MRI device 105 can capture, according to parameters of the magnetic field, the electromagnetic wave, and so on, a T2 weighted image, a TiCE image, and a FLAIR image. The T2 weighted image, the T1CE image, and the FLAIR image of a head of a patient captured by the MRI device 105, are used as input images supplied to the image diagnosis assistance device 1. These images of a head are associated with, for example, ID information of a patient.

The auxiliary storage 106 comprises a readable/writable storage medium and a driving device for reading/writing various types of information such as a program, data, and so on from/to the storage medium. Semiconductor memories such as a hard disk, a flash memory, and so on may be used to realize the storage medium in the auxiliary storage 106.

The memory 16 explained in FIG. 2 can be realized by the auxiliary storage 106.

The auxiliary storage 106 comprises a program storage region for storing the inference program 16A (an image diagnosis assistance program) that is executed by the image diagnosis assistance device 1. Further, the auxiliary storage 106 comprises a region for storing a library that is used when performing radiomics analysis of an image of a head obtained by the MRI device 105.

Further, the auxiliary storage 106 comprises a region for storing the selection condition 16C used by the selector 13 when selecting image features based on conditions that have been set based on the degree of importance of image features, and a region for storing the learned second model M2 which is used by the classification unit 14 for classifying the presence/absence of 1p/19q codeletion in image features. Further, the auxiliary storage 106 comprises a region for storing the additional data 16B that is used by the selector 13. Still further, the auxiliary storage 106 comprises a region for storing the image processing program 106A that is used by the image processor 11 for extracting a region of interest from an image of a head and generating a mask image accordingly.

Further, the auxiliary storage 106 may comprise, for example, a backup region and other regions to back up the above-explained data, programs, and so on.

The input/output I/O 107 comprises I/O terminals for inputting signals from external devices and outputting signals to external devices.

The display device 108 comprises an organic EL display, a liquid crystal display, or the like. The display device 108 may also be employed to realize the presentation unit 15 explained in FIG. 2.

Here, a program stored in the program storage region in the auxiliary storage 106 may be a program that is executed in a time series manner in accordance with the sequence of steps in the image diagnosis assistance method explained in the present specification, or a program that is executed in a parallel manner or that is called at timing when it is required to be executed. Further, a program may be executed by a single computer, or that allows distributed processing by multiple computers.

(Hardware Structure of Learning Device)

Next, an example of a hardware structure for realizing the learning device 2 according to the present embodiment will be explained by using the block diagram in FIG. 6.

Figure 6:
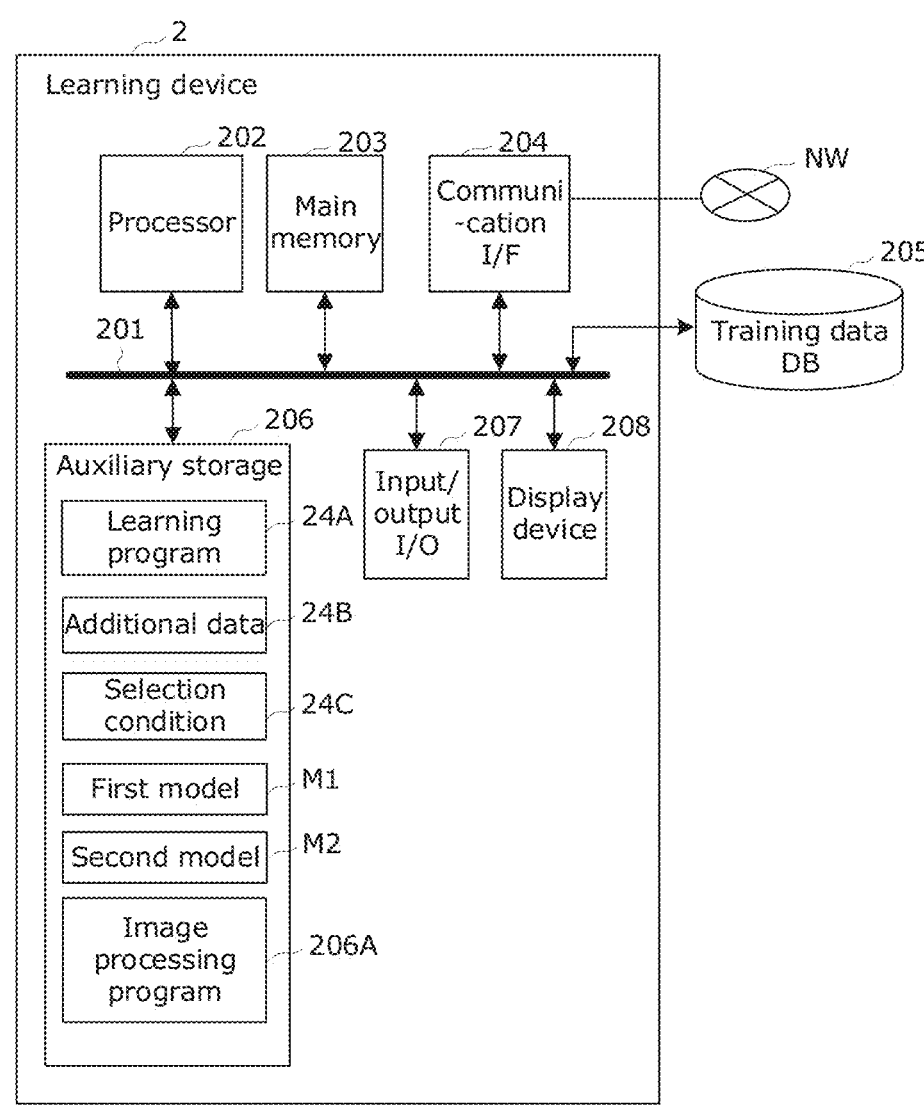
FIG. 6 is a block diagram showing an example of a hardware structure of a learning device according to the present embodiment.

As shown in FIG. 6, the learning device 6 may be realized, for example, by using a computer which comprises a processor 202, a main memory 203, a communication interface (I/F) 204, an auxiliary storage 206, and an input/output I/O 707, which are connected via a bus 201, and a program for controlling the above hardware resources. Further, the learning device 2 is connected, for example, to an external training data DB 205 via the bus 201. Further, the learning device 2 may comprise a display device 208 connected thereto via the bus 201.

Various types of functions of the learning device 2, such as the second acquisition unit 20, the image processor 21, the setting unit 22, the learning unit 23, and so on, which are shown in FIG. 2, are realized by the processor 202 and the main memory 203.

Figure 4:
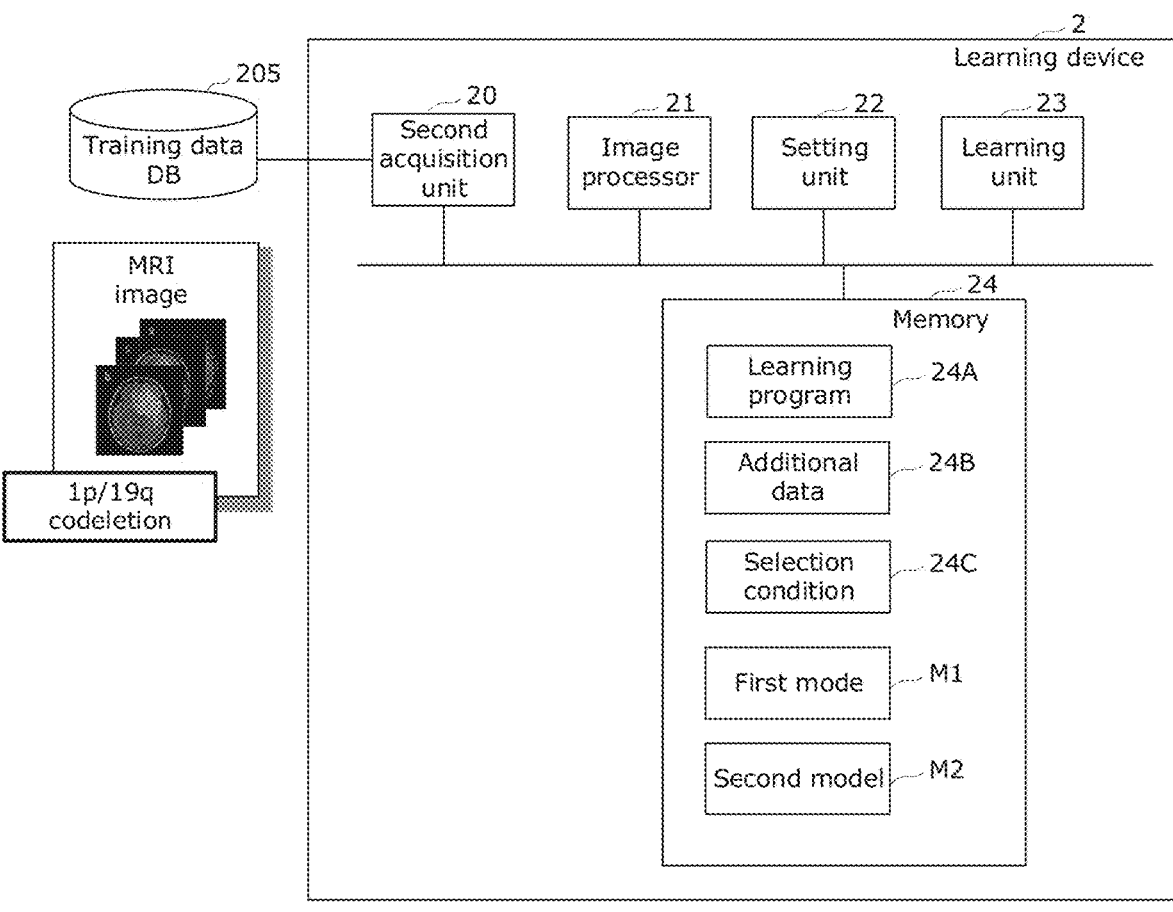
FIG. 4 is a block diagram showing a structure of a learning device according to the present embodiment.

The memory 24 explained in FIG. 4 can be realized by the auxiliary storage 206.

The auxiliary storage 106 comprises a program storage region for storing the learning program 24A that is executed by the learning device 2. Further, the auxiliary storage 206 comprises a region for storing a library that is used when performing radiomics analysis of an image of a head.

Further, the auxiliary storage 206 comprises regions for storing the first model M1 constructed via a learning process by the learning unit 23, and the second model M2 which is a classifier. Further, the auxiliary storage 206 comprises a region for storing the additional data 24B that is used for learning in the first model M1. The auxiliary storage 106 comprises a region for storing the selection condition 24C that is set based on the degree of importance obtained via learning of the first model M1. Further, the auxiliary storage 106 comprises a region for storing an image processing program 206A that is used by the image processor 21 for extracting a region of interest from an image of a head and generating a mask image accordingly.

The input/output I/O 207 comprises I/O terminals for inputting signals from external devices and outputting signals to external devices, and an input device such as a keyboard or the like. The setting unit 22 explained in FIG. 4 is realized by the input/output I/O 207.

(Operation of Image Diagnosis Assistance Device)

Figure 7:
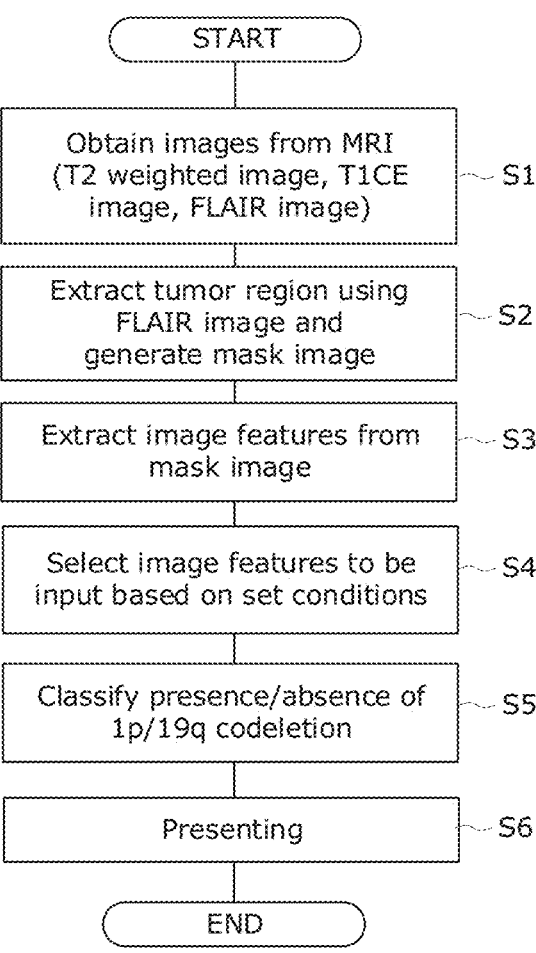
FIG. 7 is a flow chart showing an example of operation of an image diagnosis assistance device according to the present embodiment.

Next, operation of the image diagnosis assistance device 1 having the above-explained structures will be explained in detail with reference to the flow chart in FIG. 7.

The memory 16 stores in advance, the selection condition 16C set based on the first model M1 constructed via learning processes performed by the external learning device 2 or the like, and stores the second model M2, and the following processes are performed. Further, it is assumed that the additional data 16B including age of patients in connection to the images of heads for image diagnosis assistance, localization information of tumors to be analyzed, and the presence/absence of calcification in CT images of heads of patients, have been associated with ID of respective patients and have been stored in the memory 16 in advance.

First, the first acquisition unit 10 obtains images of a head generated by MRI (step S1). Specifically, the first acquisition unit 10 obtains an image set containing three types of images, specifically, a T2 weighted image, a TICE image, and a FLAIR image. Further, an ID of a patient is associated with the images obtained by the first acquisition unit 10.

Next, the image processor 11 extracts an area containing information of a lesion associated with a glioma and a peripheral margin of the legion, from an image of the head obtained by the first acquisition unit 10 in step S1 as a region of interest, and generates a mask image containing the extracted region (step S2). For example, the image processor 11 can use a FLAIR image obtained in step S1 to extract an abnormal region containing the lesion in the FLAIR image, and generate a mask image accordingly. Note that adjustments and corrections in the mask image generated by the image processor 11 may be performed in response to inputs from the external source.

Next, the extractor 12 performs radiomics analysis of the mask image generated in step S2 to extract image features from the mask image (step S3). For example, the extractor 12 extracts, from the mask image, 93 image features according to prearranged settings.

Next, the selector 13 loads the selection condition 16C stored in the memory 16, and selects image features satisfying the set conditions, among the image features extracted in step S3, and values representing age, localization information of tumors, and presence/absence of calcification in CT associated with the patient ID in the additional data 16B stored in the memory 16 (step S4). For example, the selector 13 may select, among 93 image features extracted by the extractor 12, 17 image features of specific types of image features, and input them to the second model M2. The conditions are set in advance based on the learned degree of importance.

Next, the classification unit 14 loads the learned second model M2 from the memory 16, and supplies the image features selected in step S4 as input to the learned second model M2, performs calculation thereof, and classifies whether or not the input image features have 1p/19q codeletion (step S5).

Thereafter, the presentation unit 15 presents, based on results of classification obtained in step S5, assistance information relating to presence/absence of 1p/19q codeletion inferred for the lesion associated with the glioma contained in the image of the head that corresponds to the image features, by causing the display device 108 to display the results (step S6).

Figure 8:
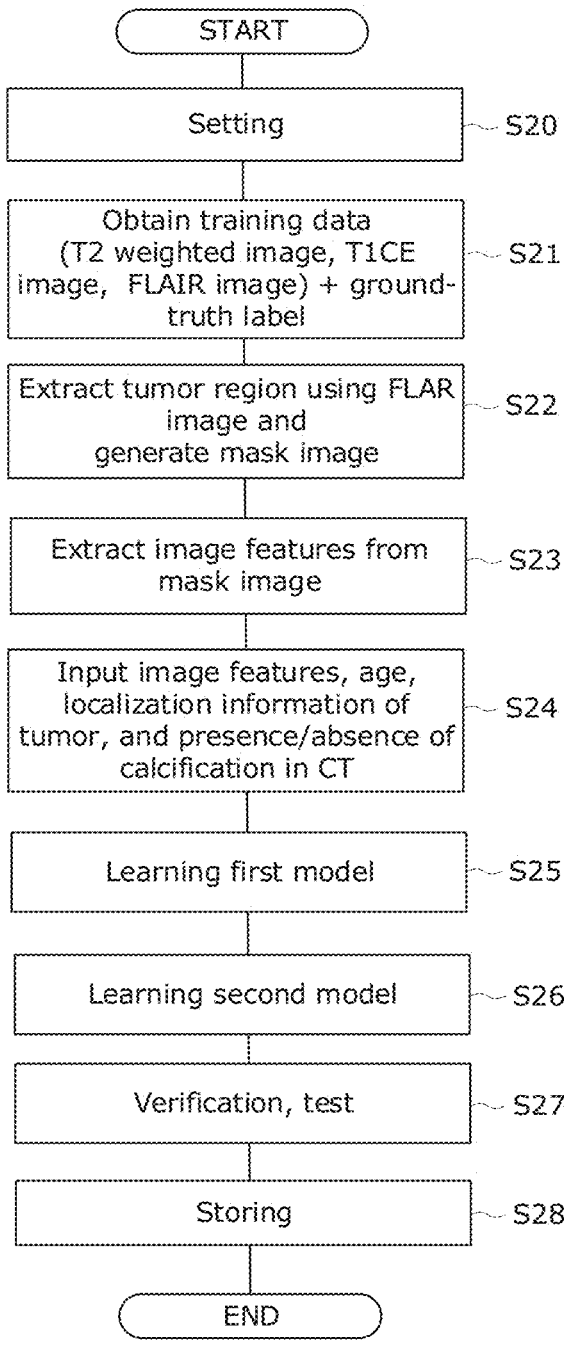
FIG. 8 is a flow chart showing an example of operation of a learning device according to the present embodiment.

(Operation of Learning Device) Next, operation of the image diagnosis assistance device 1 having the above-explained structures will be explained in detail with reference to the flow chart in FIG. 8. It is assumed that the training data DB 205 stores in advance, training data in which the ground-truth labels indicating the presence/absence of 1p/19q code-letion are given in advance to the training images containing the images of heads generated by MRI. Further, the memory 24 stores the first model M1 and the second model M2 before undergoing learning. Further, it is assumed that the memory 24 stores the additional data 24B in advance in association with training images, the additional data 24B being the age of patients, localization information of brain tumors to be analyzed, and presence/absence of calcification in CT images of heads of patients for the training images.

First, the setting unit 22 sets, in response to an input received from the external source, various types of parameters and so on for the learning processes (step S20). For example, when setting the input nodes in the first model M1 which learns degree of importance in image features, the setting unit 22 arranges a setting that some or all of the age information, localization information of tumors, and presence/absence of calcification in CT images to be included in the additional data 24B in addition to the image features.

Next, the second acquisition unit 20 obtains training data from the training data DB 205 (step S21). The training data is a data set that contains three types of images including a T2 weighted image, a TICE image, and a FLAIR image of a head of a patient generated by MRI, and to which ground-truth labels indicating whether or not lesions of gliomas contained in the images have 1p/19q codeletion are being given. Further, the training data are associated with identification information.

Next, based on the setting in step S20, the image processor 21 extracts, from a training image contained in the training data and, a region including a lesion associated with a glioma and a peripheral margin of the lesion as a region of interest, and generates a mask image containing the extracted region (step S22). More specifically, the image processor 21 can generate a mask image by using a FLAIR image among the images obtained in step S21, i.e., by extracting an abnormal region that contains a lesion from the FLAIR image. In a different structure, a region of interest may be set as a region containing a lesion associated with a glioma, a peripheral margin of the legion, and a region that extends from the peripheral margin towards outside thereof by up to approximately 5 mm, and then generating a mask image accordingly.

Next, the learning unit 23 performs radiomics analysis of the mask image generated in step S22, and extracts image features from the mask image in the training data. For example, the learning unit 23 extracts 93 image features from the mask image, according to the prearranged settings by the setting unit 22.

Next, by using the first model M1 stored in the memory 24, the learning unit 23 supplies, as input to the first model M1, image features extracted in step S23, and supplies values respectively representing the age associated with training images, localization information of tumors, and presence/absence of calcification in CT in the additional data 24B stored in the memory (step S24). Subsequently, the learning unit 23 causes the first model M1 to learn the degree of importance of the image features (step S25). In more detail, learning unit 23 causes the first model M1 to learn the degree of importance in a relationship between image features and 1p/19q codeletion, by using a gradient boosting, a random forest, a LASSO regression, or the like, based on the extracted image features, age, localization information of tumors, and the presence/absence of calcification in CT.

Next, the learning unit 23 selects image features that satisfy conditions that are set based on the degree of importance of the image features which is learned and output from the first model M1 in step S25, supplies the selected image features as input to the second model M2, and causes the second model M2 to perform learning accordingly (step S26). For example, the learning unit 23 may select 15, 17, or other numbers of image features in the order of higher degree of importance, among 93 image features extracted as a result of radiomics analysis performed in step S23. The selection condition 24C in the memory 24 stores conditions for the learning unit 23 set based on the degree of importance.

Further, in step S26, when learning a linear SVM, a random forest, a gradient boosting, or the like employed as the second model M2, the learning unit 23 performs learning of the presence/absence of 1p/19q codeletion in the image features by using, as input, 15, 17, or other number of image features selected among 93 image features.

Next, the learning unit 23 performs verification and testing of the first model M1 and the second model M2 which are learned in step S25 and step S26 (step S27). For example, the setting unit 22 adjusts the first model M1 and the second model M2 based on cross validation, overfitting and so on, and adjusts setting of models such as parameters, input data, and so on in the first model M1 and the second model M2. For example, the learning unit 23 can divide data of a training image into 10 pieces of data and performs cross validation with respect thereto. Further, in step S27, the learning unit 23 can perform testing of the inference model including the verified first model M1 and the verified second model M2, and estimate accuracy thereof in practical use.

Thereafter, the memory 24C stores the first model M1 and the second model M2 constructed via learning, and the selection condition 24C (step S28). The selection condition 24C and the learned second model M2 stored in the memory 24, are obtained by the above-explained image diagnosis assistance device 1.

Figure 9:
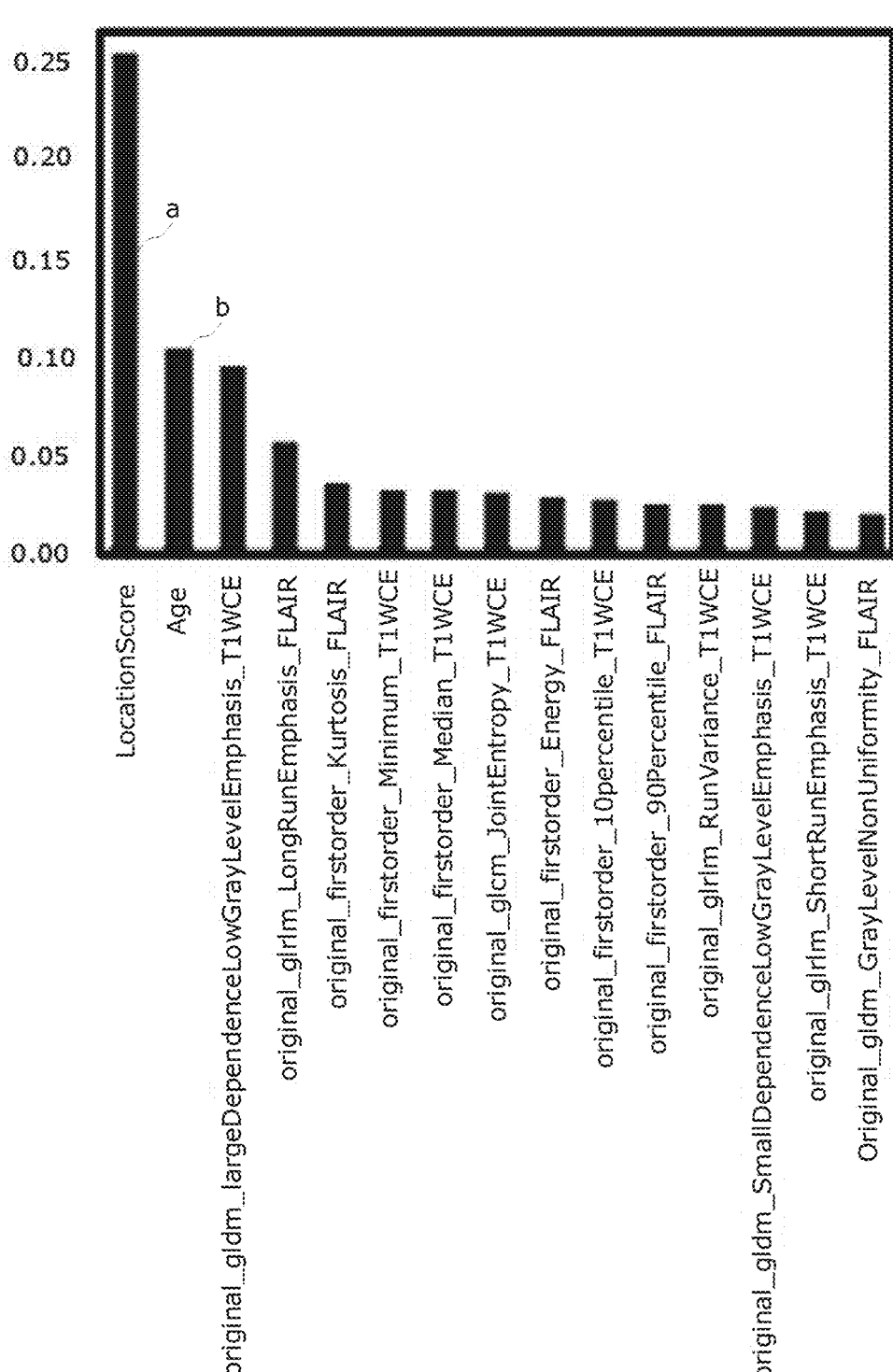
FIG. 9 is a figure for explaining effect of an image diagnosis assistance device according to the present embodiment.

In the following description, effects of the image diagnosis assistance device 1 according to the present embodiment will be explained with reference to FIG. 9 to FIG. 14. FIG. 9 is a figure showing, in the form of a bar graph, the degree of importance of each image feature obtained by the learned first model M1.

In FIG. 9, the horizontal axis shows respective image features, and the vertical axis shows the degree of importance. Image features having greater values in the vertical axis are the image features with higher degrees of importance indicating greater relevance to the presence/absence of 1p/19q codeletion. Further, in FIG. 9, for example, the feature a represents calcification information of a tumor, the feature b represents age information ("age"), and the feature c represents the presence/absence of a tumor in a frontal lobe in tumor localization information, and it is shown that the degree of importance for these features are higher. As explained above, it can be understood that the first model M1 included in the image diagnosis assistance device 1 according to the present embodiment has learned the degree of importance of the relationship between respective image features and 1p/19q codeletion.

Figure 10:
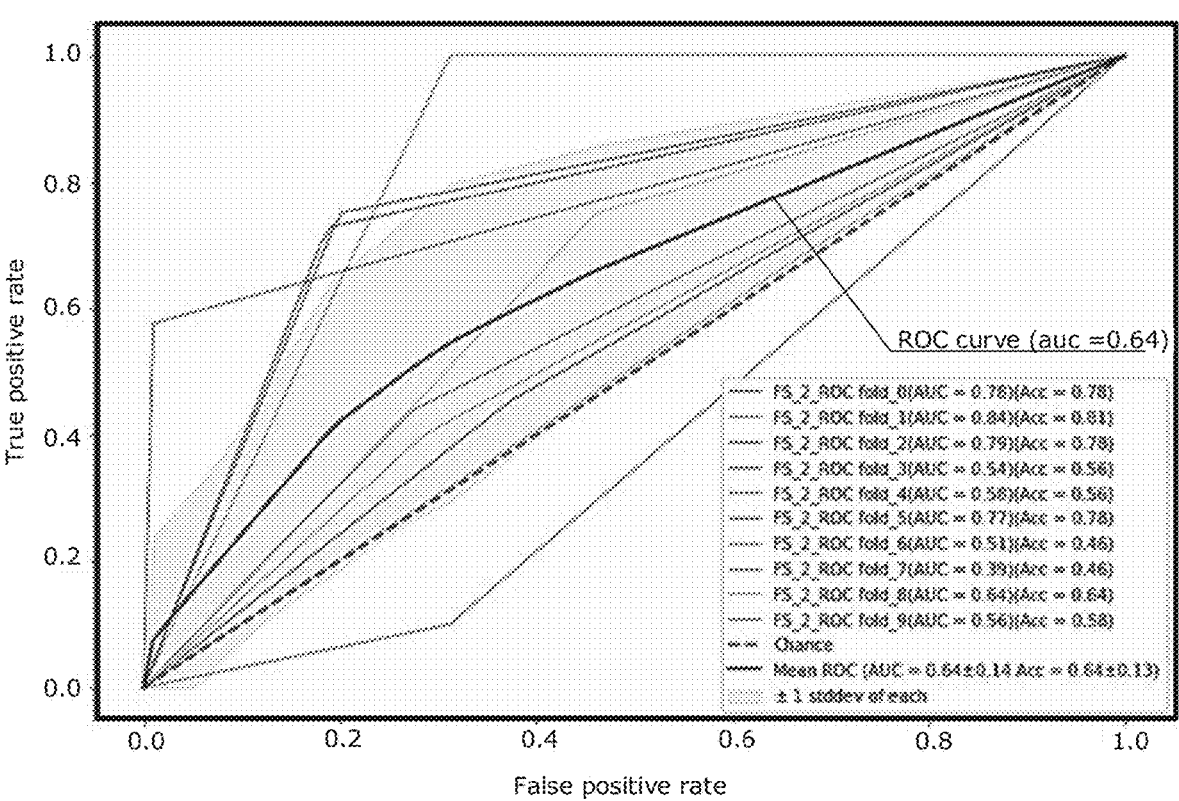
FIG. 10 is a figure for explaining effect of an image diagnosis assistance device according to the present embodiment, and showing accuracy of inference of 1p/19q codeletion based on age and presence/absence of calcification where a case group of multiple specific facilities is selected for the inference.
Figure 11:
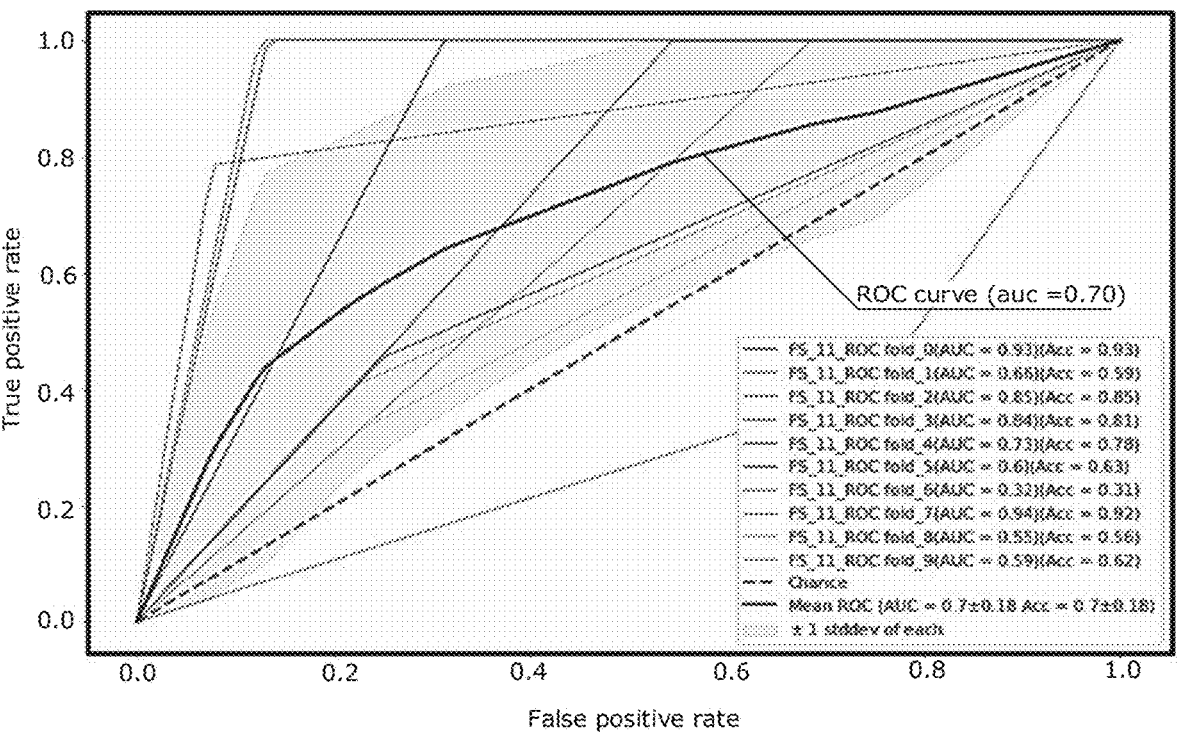
FIG. 11 is a figure for explaining effect of an image diagnosis assistance device according to the present embodiment, and showing accuracy of inference of 1p/19q codeletion based on age, presence/absence of calcification, and tumor localization where a case group of multiple specific facilities is selected for the inference.

Here, for the purpose of comparison with the accuracy of inference performed by the image diagnosis assistance device 1 according to the present embodiment, the accuracy of inference of the presence/absence of 1p/19q codeletion in prior-art examples is shown in FIG. 10 and FIG. 11. FIG. 10 is a figure showing the accuracy of inference of the presence/absence of 1p/19q codeletion in an inference model based on numerical data and disclosed in Non-patent Literature 8 when a case group in multiple specific facilities are being selected, and the age information and presence/absence of calcification in CT are being taken into consideration. As shown in FIG. 10, an ROC (Receiver Operating Characteristic) curve where a horizontal axis represents false positive rates and a vertical axis represents true positive rates. The value for the AUC (Area Under the Curve), that is an area below the ROC curve, shown in FIG. 10 is 0.64.

On the other hand, FIG. 11 shows the accuracy of inference of the presence/absence of 1p/19q codeletion by an inference model based on numerical data disclosed in Non-patent Literature 8 when a case group in multiple specific facilities are being selected, and localization information of tumors, in addition to the age information and presence/absence of calcification in CT are being taken into consideration. The value for the area (AUC) below the ROC curve shown in FIG. 11 is 0.70, and it shows an improved accuracy compared to the accuracy of inference under the conditions shown in FIG. 10.

Figure 12:
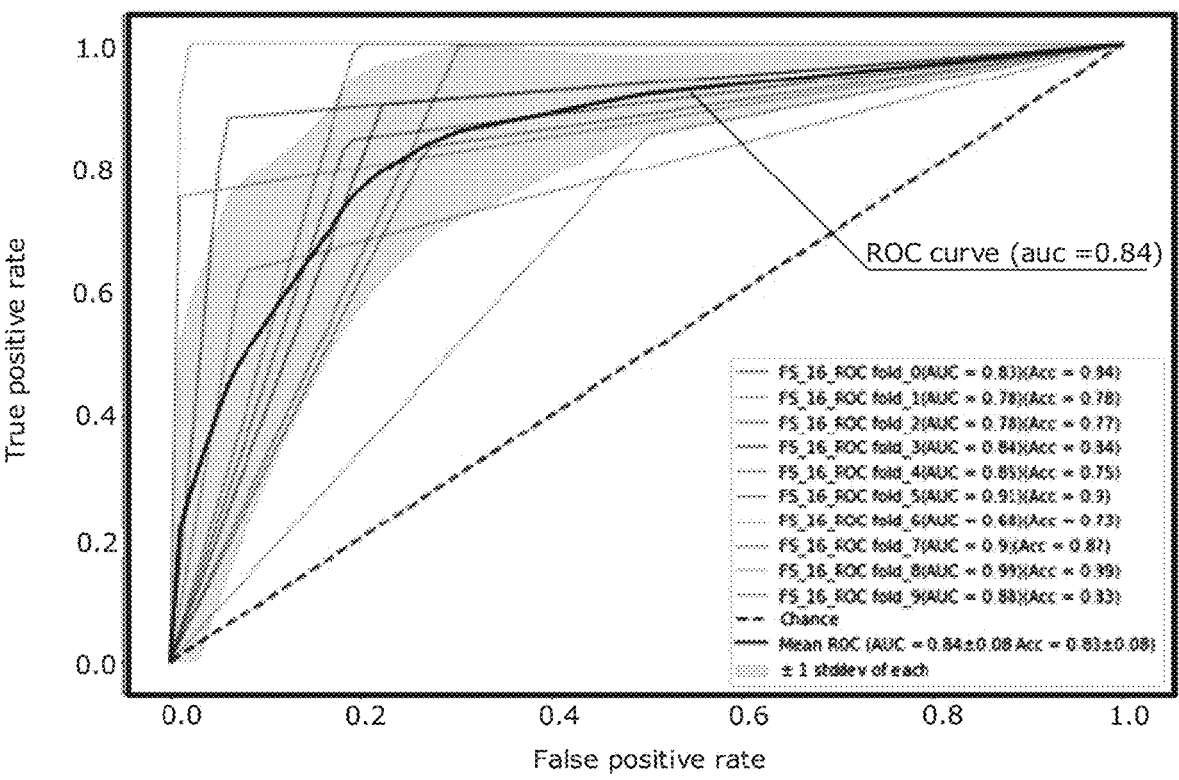
FIG. 12 is a figure for explaining effect of an image diagnosis assistance device according to the present embodiment.
Figure 13:
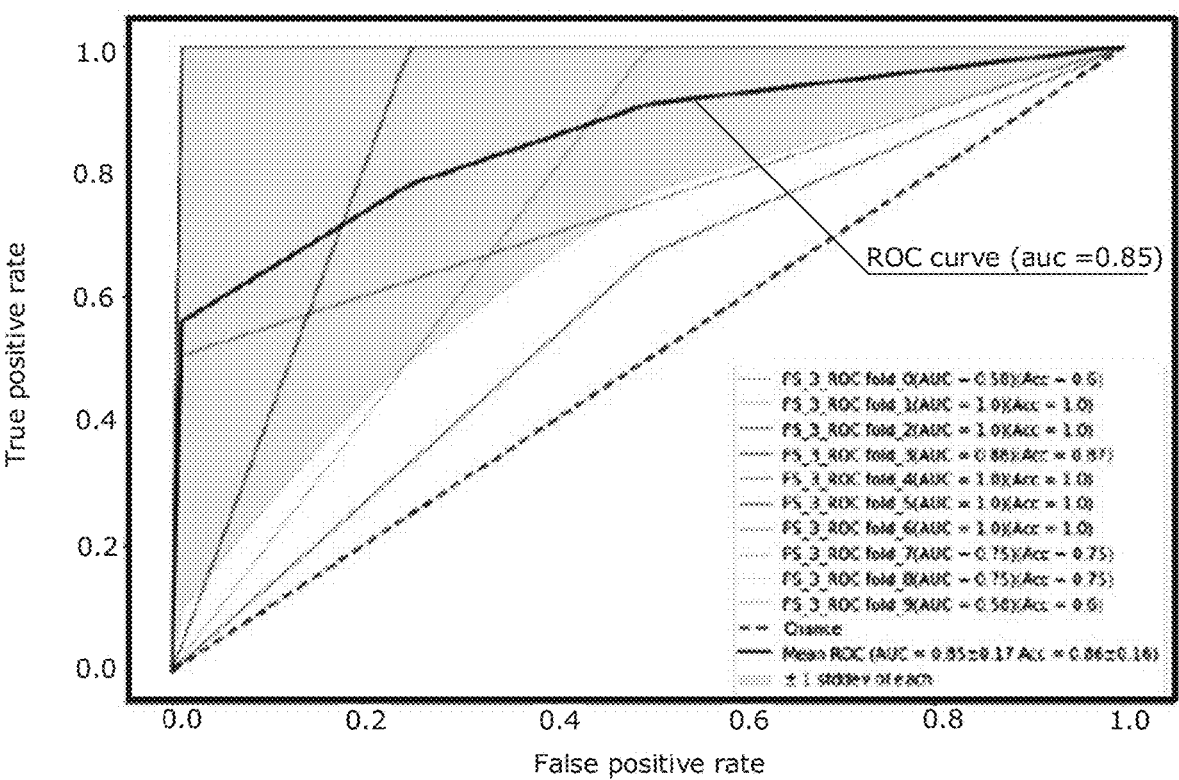
FIG. 13 is a figure for explaining effect of an image diagnosis assistance device according to the present embodiment.
Figure 14:
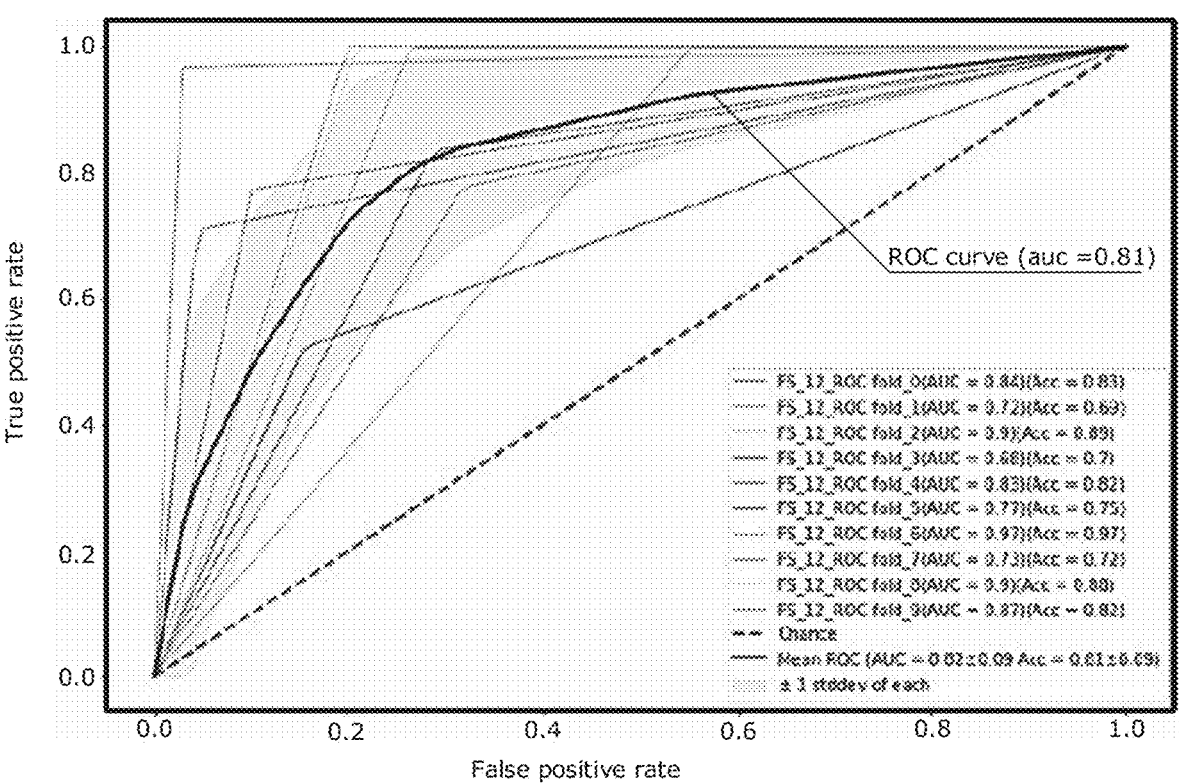
FIG. 14 is a figure for explaining effect of an image diagnosis assistance device according to the present embodiment, and showing accuracy of inference of 1p/19q codeletion based on age, presence/absence of calcification, and tumor localization and when a machine learning technique is further used, and when a case group of multiple specific facilities is selected for the inference.

On the other hand, each of FIG. 12 to FIG. 14 shows the accuracy of inference of the presence/absence of 1p/19q codeletion obtained by the mage diagnosis assistance device 1 according to the present embodiment which employs a machine learning technique. FIG. 12 shows an example of inference accuracy of the presence/absence of 1p/19q codeletion in the image diagnosis assistance device 1. The image diagnosis assistance device 1 comprising the second model M2 learned based on labeled training data of 31 images having 1p/19q codeletion, and 31 images having no 1p/19q codeletion, and comprising the trained first model M1. The value of the area (AUC) below the ROC curve shown in FIG. 12 is 0.84. Note here that the example in FIG. 12 shows an ROC curve when 16 image features are being input to the classifier.

FIG. 13 shows an example of inference accuracy of the presence/absence of 1p/19q codeletion in the image diagnosis assistance device 1. The image diagnosis assistance device 1 comprises the learned second model M2, and the learned first model M1 in which the presence/absence of calcification in CT is being taken into consideration. According to the example in FIG. 13, the learning is performed based on labeled training data where 25 images having 1p/19q codeletion, and 23 images having no 1p/19q codeletion; and the value of the AUC representing the accuracy of inference is obtained as 0.85. Note that in the present example, the image features are selected by a gradient boosting.

FIG. 14 shows accuracy of inference of the presence/absence of 1p/19q codeletion in the image diagnosis assistance device 1. The image diagnosis assistance device 1 comprises the learned second model M2 and the learned first model M1 in which age information, presence/absence of calcification in CT, and localization information of tumors are being taken into consideration, and that the same subjects as those (the case group in the multiple specific facilities) shown in FIGS. 10 and 11 are being used. The value of the area (AUC) below the ROC curve shown in FIG. 14 is 0.81. It can be understood especially that the accuracy is significantly improved compared to the accuracy of inference in the prior-art example shown in FIG. 11.

As explained above, the accuracy of inference in the inference models based on numerical data in the prior-art examples are 64% (FIG. 10) and 70% (FIG. 11), respectively; however, in every analysis shown in FIG. 12 to FIG. 14, the accuracy of inference of the presence/absence of 1p/19q codeletion using the image diagnosis assistance device 1 according to the present embodiment comprising the learned first model M1 and the learned second model M2 is equal to or greater than 81%, showing that there is a significant improvement in accuracy of inference.

As explained above, according to the image diagnosis assistance device 1 of the present embodiment, a region containing information on a peripheral margin of a brain tumor is extracted as a region of interest from an image of a head generated by MRI to generate a mask image, and the image features are extracted from the mask image based on the radiomics analysis. Further, the second model M2 which learns whether or not an image feature has 1p/19q codeletion is utilized for the classification of the presence/absence of 1p/19q codeletion in an extracted image feature. Thus, it is possible to infer, based on an image of a head, presence/absence of a molecular biomarker of a brain tumor.

Further, according to the image diagnosis assistance device 1 of the present embodiment, an image feature extracted by radiomics analysis is classified using a classifier, such as an SVM, a random forest, a gradient boosting, or the like, for the interference of whether or not a lesion has 1p/19q codeletion. Further, an image feature that is input to a classifier such as an SVM are selected based on the degree of importance representing the degree of relevance to the 1p/19q codeletion. Thus, it is possible to improve accuracy of inference of the presence/absence of 1p/19q codeletion in a glioma, and possible to perform image diagnosis assistance that ensures sufficient specificity and sensitivity, objectivity, and greater versatility.

Further, the image diagnosis assistance device 1 according to the present embodiment extracts from a FLAIR image, an abnormal region containing a lesion associated with a glioma when designating a region of interest in an image of a head generated by MRI, and sets a region containing information on a peripheral margin of the legion in addition to the region of the lesion as a region to be analyzed Because a mask image containing a region of interest explained above are being used as a region to be analyzed, relevance to the 1p/19q codeletion in a peripheral margin of a lesion associated with a glioma can be taken into consideration, so that accuracy of inference of the presence/absence of 1p/19q codeletion can be improved.

Further, the image diagnosis assistance device 1 according to the present embodiment performs, based on an image of a head, inference of the presence/absence of a molecular biomarker of a brain tumor, so that it becomes possible to draft a treatment plan based on imaging finding rather than on pathological diagnosis. Especially, it becomes possible to establish treatment strategies including neoadjuvant chemotherapy for a brain tumor, so that it becomes possible to avoid a risk of complication associated with a case where resection of the maximum possible quantity of a brain tumor is attempted, to reduce the size of the region in a brain to be removed, and to improve the rate of resection of a tumor, and, further, to set radiotherapy aside. For the reasons shown above, improvement in safety and effect of treatment can be achieved.

On the other hand, even in the case where a good chemotherapy response is not forecasted, the purpose of the initial surgery and the whole treatment strategy become clear prior to the surgery, and in addition to going without placing an intracerebrally-indwelling anticancer agent, it becomes possible to avoid treatments having limited effect and may be leading to adverse effects. Because of the treatment plan based on the imaging fining prior to the surgery and individualization of the treatment plan, it becomes possible to design, before undergoing surgery, the comprehensive treatment strategy including a surgery plan for resection, in addition to adjuvant therapy. Further, as a result thereof, advancement and improvement in individualized treatment of a brain tumor, functional prognosis, and life prognosis are expected.

In the above description, embodiments of an image diagnosis assistance device, an image diagnosis assistance method, and an image diagnosis assistance program according to the present disclosure have been explained; however, the present disclosure is not limited to any of the explained embodiments, and an embodiment can be modified to have various forms that can be reasonably anticipated by a person skilled in the art within the scope of the invention disclosed in the claims.

For example, according to the explanation of the embodiment, the extractor 12 extracts image features by radiomics analysis. However, as mentioned previously, the extractor 12 may extract image features using a convolutional neural network such as a VGG19 or the like. Although the last layer in VGG19 captures features of the whole image, respective features of respective parts contained in the image are captured in layers prior to the last layer, and such a structure may be employed. Further, in the above case, it is possible to omit the process of the learning unit 23 causing the first model M1 to learn the degree of importance indicating relationship between an image feature and 1p/19q codeletion using a gradient boosting or the like, in other words, the process of the selector 13 selecting the image features satisfying the set conditions among image features extracted by the extractor 12 and sending them to the classification unit 14 may be omitted.

Further, according to the explanation of the embodiment, the presence/absence of 1p/19q codeletion is inferred as a molecular biomarker of a glioma. However, the molecular biomarker may be, for example, a presence/absence of methylation in a promotor region in an MGMT gene.

Further, according to the explanation of the embodiment, the extractor 12 and the selector 13 are constructed as separate functional blocks. However, a structure where the extractor 12 including the function of the selector 13 may be employed. In such a case, the extractor 12 is configured to extract image features from a mask image of a region of interest generated by the image processor 11, and then select image features satisfying the set conditions, among the extracted image features, and send them to the classification unit 14.

Further, the image diagnosis assistance program according to the explained embodiment is recorded in a storage medium, such as a hard disk, a flexible disk, or the like, which can be read by a computer, and executed by the computer as a result that the program is read from the storage medium. Further, the program may be a transmission medium which can be distributed via a network such as the Internet or the like.

It should be reminded that each of the various types of functional blocks, modules, and circuits, which were described in relation to the embodiments disclosed herein, may be implemented by a general-purpose processor, a GPU, a digital signal processor (DSP), an application-specific integrated circuit (ASIC), an FPGA or any of other programmable logic devices, a discrete gate or a transistor logic, or a discrete hardware part, or a combination which comprises some of the above devices and is designed to realize the above-explained functions.

Although it is possible to use a microprocessor as a general-purpose processor, it is also possible to use a processor, a controller, a microcontroller, or a state machine in prior art. It is possible to realize the processor as that comprising a combination of a DSP and a microprocessor, multiple microprocessors, one or multiple microprocessors connected to a DSP core, or a combination of calculation devices having an arbitrarily selected structure similar that in structures shown above.

REFERENCE SIGNS LIST

1 . . . Image diagnosis assisting device: 2 . . . Learning device: 10 . . . First acquisition unit: 11, 21 . . . Image processor: 12 . . . Extractor: 13 . . . Selector: 14 . . . Classification unit: 15 . . . Presentation unit: 16, 24 . . . Memory: 16A . . . Inference program: M1 . . . First model: M2 . . . Second model: 16B, 24B . . . Additional data: 16C, 24C . . . Selection condition: 24A . . . Learning program: 101, 201 . . . Bus: 102, 202 . . . Processor: 103, 203 . . . Main memory: 104, 204 . . . Communication I/F: 105 . . . MRI device: 106, 206 . . . Auxiliary storage: 106A, 206A . . . Image processing program: 107, 207 . . . Input/output I/O: 108, 208 . . . Display device: 205 . . . Teaching data DB: NW . . . Network:

The invention claimed is:

1. An image diagnosis assistance device comprising:
acquisition circuitry configured to obtain an image of a head generated by Magnetic Resonance Imaging (MRI);
an image processor configured to
    extract, from the obtained image of the head, a region containing information on a lesion and a peripheral margin of the lesion, and
    generate a first image containing the extracted region;
a first extraction circuitry configured to extract predetermined first image features from the first image;
a classification circuitry configured to classify, based on the predetermined first image features extracted by the first extraction circuitry, a presence/absence of a molecular biomarker associated with the lesion using a classifier constructed in advance; and
a presentation circuitry configured to present, based on a result of classification from the classification circuitry, assistance information relating to whether or not the lesion contained in the image of the head has the molecular biomarker.

2. The image diagnosis assistance device according to claim 1, further comprising:
a second extraction circuitry configured to extract, from the predetermined first image features extracted by the first extraction circuitry, second image features in accordance with
a degree of importance representing a degree of relevance between each first image feature extracted by the first extraction circuitry and the molecular biomarker, and wherein
the classification circuitry is further configured to classify the presence/absence of the molecular biomarker in the lesion for the second image features extracted by the second extraction circuitry.

3. The image diagnosis assistance device according to claim 1, wherein the image processor uses a FLAIR image in images of the head generated by MRI, extracts, from the image of the head, a region containing the lesion and generates the first image.

4. The image diagnosis assistance device according to claim 1, wherein the first extraction circuitry is further configured to extract the predetermined first image features by performing radiomics analysis of the first image.

5. The image diagnosis assistance device according to claim 1, wherein the classifier comprises any of a support vector machine, a random forest, and a gradient boosting tree.

6. The image diagnosis assistance device according to claim 1, wherein the lesion indicates a glioma, and the molecular biomarker associated with the lesion is 1p/19q codeletion.

7. The image diagnosis assistance device according to claim 1, wherein the presentation circuitry is further configured to display, on a display screen, the image of the head, the first image, and the assistance information relating to whether or not the lesion contained in the image of the head has the molecular biomarker based on the result of classification.

8. The image diagnosis assistance device according to claim 1, wherein the lesion indicates a glioma, and the molecular biomarker associated with the lesion is a presence/absence of methylation in a promotor region in an MGMT gene.

9. The image diagnosis assistance device according to claim 1, wherein the lesion indicates a glioma, and the molecular biomarker associated with the lesion is a presence/absence of mutation in an IDH 1/2 gene.

10. The image diagnosis assistance device according to claim 1, wherein the lesion indicates a grade-2 or grade-3 glioma.

11. The image diagnosis assistance device according to claim 6, wherein the first extraction circuitry is further configured to utilize a convolutional neural network to extract the predetermined first image features.

12. An image diagnosis assistance device comprising:

an acquisition circuitry configured to obtain an image of a head generated by MRI;

an image processor configured to extract, from the obtained image of the head, a region containing information on a lesion and a peripheral margin of the lesion, and generating a first image containing the extracted region;

a first extraction circuitry configured to extract predetermined first image features from the first image, and extracting, from the predetermined first image features, second image features in accordance with a degree of importance that represents a degree of relevance to a molecular biomarker;

a classification circuitry configured to classify, based on the second image features extracted by the first extraction circuitry, a presence/absence of the molecular biomarker associated with the lesion using a classifier constructed in advance; and a presentation circuitry configured to present, based on a result of classification from the classification circuitry, assistance information relating to whether or not the lesion contained in the image of the head has the molecular biomarker.

13. The image diagnosis assistance device according to claim 12, wherein the degree of importance is obtained by a learning model learned in advance, the degree of relevance between an image feature and the molecular biomarker.

14. The image diagnosis assistance device according to claim 13, wherein the degree of importance is obtained by learning of the learning model, wherein a presence/absence of calcification in the lesion in a CT image of the head corresponding to the image of the head is taken into consideration in the learning.

15. The image diagnosis assistance device according to claim 13, wherein the degree of importance is obtained by learning of the learning model, wherein age of a test subject of the image of the head and localization information of the lesion in the head are taken into consideration in the learning.

16. The image diagnosis assistance device according to claim 13, wherein the learning model comprises any of a random forest, a gradient boosting tree, and a LASSO model.

17. The image diagnosis assistance device according to claim 14, wherein the first extraction circuitry is further configured to utilize a convolutional neural network to extract the predetermined first image features.

18. An image diagnosis assistance method comprising:

a first step of obtaining an image of a head generated by MRI;

a second step of extracting, from the obtained image of the head, a region containing information on a lesion and a peripheral margin of the lesion, and generating a first image containing the extracted region;

a third step of extracting predetermined first image features from the first image;

a fourth step of performing, based on the predetermined first image features extracted in the third step, classification of a presence/absence of a molecular biomarker associated with the lesion using a classifier constructed in advance; and a fifth step of presenting, based on a result of classification in the fourth step, assistance information relating to whether or not the lesion contained in the image of the head has the molecular biomarker.

19. The image diagnosis assistance method according to claim 18, further comprising:

a sixth step of extracting, from the predetermined first image features extracted in the third step, second image features in accordance with a degree of importance representing a degree of relevance between each first image feature extracted in the third step and the molecular biomarker,

wherein the degree of importance is obtained from a learning model learned in advance, the degree of relevance between an image feature and the molecular biomarker, and in the fourth step, the presence/absence of the molecular biomarker in the lesion is classified for the second image features extracted in the sixth step.

20. A non-transitory computer-readable medium comprising an image diagnosis assistance program that, when executed by an electronic processor, causes the electronic processor to perform a set of operations comprising:

obtaining an image of a head generated by MRI;

extracting, from the obtained image of the head, a region containing information on a lesion and a peripheral margin of the lesion;

generating a first image containing the extracted region;

extracting predetermined first image features from the first image;

classifying, based on the predetermined first image features, a presence/absence of a molecular biomarker associated with the lesion using a classifier constructed in advance; and presenting, based on classifying the presence/absence of a molecular biomarker, assistance information relating to whether or not the lesion contained in the image of the head has the molecular biomarker.

21. The non-transitory computer-readable medium according to claim 20, wherein the set of operations further includes

28 extracting, from the predetermined first image features, second image features in accordance with a degree of importance representing a degree of relevance between each of the predetermined first image features and the molecular biomarker;

wherein the degree of importance is obtained from a learning model learned in advance, the degree of relevance between an image feature and the molecular biomarker, and the presence/absence of the molecular biomarker in the lesion is classified for the second image features.

22. An image diagnosis assistance device comprising:

acquisition circuitry configured to obtain an image of a head generated by MRI;

an extraction circuitry configured to extract first image features from the image of the head;

a classification circuitry configured to classify, based on the first image features extracted by the extraction circuitry, a presence/absence of a molecular biomarker associated with a lesion contained in the image of the head using a classifier constructed in advance; and a presentation circuitry configured to present, based on a result of classification from the classification circuitry, assistance information relating to whether or not the lesion contained in the image of the head has the molecular biomarker.

* * * * *